United States Patent
Fugiel et al.

US007622192B2

(10) Patent No.: US 7,622,192 B2
(45) Date of Patent: Nov. 24, 2009

(54) SOLAR CONTROL LAMINATES

(75) Inventors: Richard A. Fugiel, Long Grove, IL (US); Richard Allen Hayes, Beaumont, TX (US); Walter Mahler, Wilmington, DE (US); Thomas R. Phillips, Vienna, WV (US); Lee A. Silverman, Newark, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 11/646,634

(22) Filed: Dec. 28, 2006

(65) Prior Publication Data

US 2007/0228340 A1 Oct. 4, 2007

Related U.S. Application Data

(60) Provisional application No. 60/755,378, filed on Dec. 30, 2005, provisional application No. 60/755,402, filed on Dec. 30, 2005, provisional application No. 60/755,636, filed on Dec. 30, 2005.

(51) Int. Cl.
*B32B 17/10* (2006.01)

(52) U.S. Cl. ............... 428/442; 428/412; 428/441; 428/463; 428/517; 428/520; 428/522

(58) Field of Classification Search ............ 428/441, 428/442, 412, 463, 517, 520, 522
See application file for complete search history.

(56) References Cited

U.S. PATENT DOCUMENTS

| | | | |
|---|---|---|---|
| 3,344,014 A | 9/1967 | Rees | |
| 3,762,988 A | 10/1973 | Clock et al. | |
| 4,197,222 A | 4/1980 | Wegmann | |
| 4,663,228 A | 5/1987 | Bolton et al. | |
| 4,668,574 A | 5/1987 | Bolton et al. | |
| 4,769,307 A | 9/1988 | Ozawa et al. | |
| 4,799,346 A | 1/1989 | Bolton et al. | |
| 5,002,820 A | 3/1991 | Bolton et al. | |
| 5,296,162 A | 3/1994 | Itoh et al. | |
| 5,344,513 A | 9/1994 | Takenaka | |
| 5,358,833 A | 10/1994 | Itoh et al. | |
| 5,409,634 A | 4/1995 | Itoh et al. | |
| 5,446,142 A | 8/1995 | Itoh et al. | |
| 5,476,553 A | 12/1995 | Hanoka et al. | |
| 5,478,402 A | 12/1995 | Hanoka | |
| 5,594,128 A | 1/1997 | Wolleb | |
| 5,646,273 A | 7/1997 | Oguchi et al. | |
| 5,663,326 A | 9/1997 | Wolleb | |
| 5,683,804 A * | 11/1997 | Nagashima et al. | 428/336 |
| 5,750,229 A | 5/1998 | Oguchi et al. | |
| 5,759,698 A | 6/1998 | Tanuma et al. | |
| 5,763,062 A | 6/1998 | Smith et al. | |
| 5,830,568 A | 11/1998 | Kondo | |
| 5,895,721 A | 4/1999 | Naoumenko et al. | |
| 6,051,060 A | 4/2000 | Mizobuchi | |
| 6,114,046 A | 9/2000 | Hanoka | |
| 6,150,028 A | 11/2000 | Mazon | |
| 6,187,448 B1 | 2/2001 | Hanoka et al. | |
| 6,187,845 B1 * | 2/2001 | Renz et al. | 524/91 |
| 6,238,801 B1 | 5/2001 | Naoumenko et al. | |
| 6,265,054 B1 | 7/2001 | Bravet et al. | |
| 6,315,848 B1 | 11/2001 | Kondo | |
| 6,320,116 B1 | 11/2001 | Hanoka | |
| 6,329,061 B2 | 12/2001 | Kondo | |
| 6,353,042 B1 | 3/2002 | Hanoka et al. | |
| 6,432,522 B1 | 8/2002 | Friedman et al. | |
| 6,540,624 B1 | 4/2003 | Isogawa | |
| 6,579,608 B1 | 6/2003 | Kondo | |
| 2002/0155302 A1 | 10/2002 | Smith et al. | |
| 2002/0182422 A1 | 12/2002 | Garrett et al. | |
| 2002/0188051 A1 | 12/2002 | Hugo | |
| 2003/0044579 A1 | 3/2003 | Bolton et al. | |
| 2004/0241458 A1 | 12/2004 | D'Haene et al. | |

FOREIGN PATENT DOCUMENTS

| | | |
|---|---|---|
| EP | 0 373 643 B1 | 6/1990 |
| EP | 0 483 087 A1 | 4/1992 |
| EP | 0 576 419 B1 | 1/1994 |
| EP | 1 072 959 A1 | 1/2001 |
| EP | 1 235 683 B1 | 9/2002 |
| JP | 03-079687 | 4/1991 |
| JP | 2001/011256 | 1/2001 |
| JP | 2001/058465 | 3/2001 |
| WO | WO 99/58334 | 11/1999 |
| WO | WO 00/01880 | 1/2000 |
| WO | WO 00/64670 | 11/2000 |

(Continued)

OTHER PUBLICATIONS

PC International Search Report and Written Opinion for International Application No. PCT/US2006/049631, dated Jul. 30, 2007.

*Primary Examiner*—D. S Nakarani
(74) *Attorney, Agent, or Firm*—Maria M. Kourtakis; Kelly Law Registry

(57) ABSTRACT

Provided is a solar control composition comprising an infrared absorbing phthalocyanine, naphthalocyanine or rylene compound and an ethylene acid copolymer or an ionomer of an ethylene acid copolymer. Further provided are solar control laminates comprising the solar control composition of the invention.

14 Claims, No Drawings

FOREIGN PATENT DOCUMENTS

| WO | WO 01/00404 A1 | 1/2001 |
| WO | WO 01/60604 A1 | 8/2001 |
| WO | WO 02/070254 A1 | 9/2002 |
| WO | WO 03/057478 A1 | 7/2003 |
| WO | WO 2004/011755 A1 | 2/2004 |
| WO | WO 2006/128090 A2 | 11/2006 |

* cited by examiner

SOLAR CONTROL LAMINATES

CROSS-REFERENCE TO RELATED APPLICATIONS

This application claims priority under 35 U.S.C. §120 to U.S. Provisional Application Nos. 60/755,378, 60/755,402 and 60/755,636, filed on Dec. 30, 2005, each of which is incorporated herein by reference in its entirety.

BACKGROUND OF THE INVENTION

1. Field of the Invention

The present invention pertains to the field of devices that reduce the transmission of radiation, and particularly to devices that reduce the transmission of infrared light.

2. Description of the Related Art

Several patents and publications are cited in this description in order to more fully describe the state of the art to which this invention pertains. The entire disclosure of each of these patents and publications is incorporated by reference herein.

Glass laminated products or "safety glass" have contributed to society for almost a century. Safety glass is characterized by high impact and penetration resistance, and by minimal scattering of glass shards and debris upon shattering. The laminates typically consist of a sandwich of a polymeric film or sheet interlayer that is placed between two glass sheets or panels. One or both of the glass sheets may be replaced with optically clear rigid or non-rigid polymeric sheets such as sheets of polycarbonate materials or polyester films. Safety glass has further evolved to include more than two layers of glass and/or polymeric sheets bonded together with more than one interlayer.

Beyond the well known safety glass commonly used in automotive windshields, glass laminates are incorporated as windows into trains, airplanes, ships, and nearly every other mode of transportation. The architectural use of safety glass has also expanded rapidly in recent years, as designers incorporate more glass surfaces into buildings.

Society continues to demand more functionality from laminated glass products beyond its optical and decorative capabilities and safety characteristics. One desirable goal is the reduction of energy consumption within structures, such as automobiles or buildings through the development of solar control glazing. Because the near infrared spectrum is not sensed by the human eye, a typical approach has been to develop glass laminates that prevent a portion of solar energy from the near infrared spectrum from entering the structure. For example, the energy expended on air conditioning may be reduced in structures equipped with solar control windows that block a portion of the near infrared spectrum without a reduction or distortion of the transmitted visible light spectrum.

Solar control in glass laminates may be achieved through modification of the glass or of the polymeric interlayer, by the addition of further solar control layers, or combinations of these approaches. One form of solar control laminated glass includes metallized substrate films, e.g., polyester films upon which electrically conductive aluminum or silver metal layers have been deposited. The metallized films generally reflect light of the appropriate wavelengths to provide adequate solar control properties. Metallized films are commonly manufactured by vacuum deposition or sputtering processes that require a high vacuum apparatus and a precision atmosphere controlling system. In addition to infrared light, metallized films also reflect certain radio wavelengths, thus impairing the function of radio, television, global positioning systems (GPS), automated toll collection, keyless entry, communication systems, automatic garage openers, automated teller machines, radio frequency identification (RFID), and like systems commonly used in automobiles or other structures that may be protected by solar control laminated glass. This impairment is a direct result of the metal layers being continuous and, therefore, electrically conductive.

A more recent trend has been the use of metal containing nanoparticles that absorb rather than reflect infrared light. To preserve the clarity and transparency of the substrate, these materials ideally have nominal particle sizes below about 200 nanometers (nm). Because these materials do not form electrically conductive films, the operation of radiation transmitting and receiving equipment located inside structures protected by this type of solar control glazing is not impeded. The addition of the nanoparticles into the polymeric interlayers necessarily complicates the processes by which these laminates are produced, however.

Infrared absorbing phthalocyanines and phthalocyanine-based materials are known for use in optical information recording media, sometimes in conjunction with a binder resin that may comprise polyvinyl butyral. Recent examples of patents in this field include U.S. Pat. Nos. 6,057,075; 6,197,472; 6,576,396; 6,197,464; 6,207,334; 6,238,833; 6,376,143; 6,465,142; and 6,489,072.

Alkoxy-substituted phthalocyanine compounds have also been used as infrared absorbing materials in optical information recording media, sometimes in conjunction with a binder resin. See, for example, U.S. Pat. Nos. 4,769,307; 5,296,162; 5,409,634; 5,358,833; 5,446,142; 5,646,273; 5,750,229; 5,594,128; 5,663,326; and 6,726,755; and European Patent No. 0 373 643.

Also known are various solar control devices that include organic infrared absorbing materials such as phthalocyanine compounds. For example, the Avecia Corp. of Wilmington, Del., markets several phthalocyanine compounds as infrared absorbers for incorporation into glazing materials such as glass, plastics and film coatings. For examples of phthalocyanine containing glass laminate interlayer compositions, see U.S. Pat. Nos. 5,830,568; 6,315,848; 6,329,061; and 6,579, 608; U.S. Patent Application Publication No. 2004/0241458; and International Patent Application Publication No. 2002/070254.

Infrared absorbing naphthalocyanine materials have also been generally disclosed for use in optical information recording media, which may include binder resins. For example, see U.S. Pat. Nos. 4,492,750; 4,529,688; 4,769,307; 4,886,721; 5,021,563; 4,927,735; 4,960,538; 5,282,894; 5,446,142; 5,484,685; 6,197,851; 6,210,848; 6,641,965; 5,039,600 and 5,229,859. Certain naphthalocyanine materials dispersed in binder resins, which may include polyvinyl butyral, are also known in the art. For example, U.S. Pat. No. 4,766,054 describes an optical recording medium that includes certain naphthalocyanine dyes.

Rylene pigments and dyes, such as quaterrylene pigments and dyes, are also known in the art. See, for example, U.S. Pat. Nos. 5,405,962; 5,986,099; 6,124,458; 6,486,319; 6,890,377; and 6,878,825; and U.S. Patent Appln. Publn. Nos. 2004/0049030 and 2004/0068114. In addition, quaterrylene dyes have been incorporated into plasticized poly(vinyl butyral) glass laminates. See, for example, U.S. Pat. No. 6,737,159.

Phthalocyanine-type, naphthalocyanine-type and rylene-type infrared absorbers are often relatively inefficient solar control agents, however, because they are highly colored. Stated alternatively, many phthalocyanines and naphthalocyanines have a significant level of absorption of visible wavelengths.

It remains desirable, therefore, to provide new solar control laminates that reduce the transmission of infrared energy and provide more efficient transmission of visible light and radio frequencies.

SUMMARY OF THE INVENTION

The present invention provides a solar control composition comprising an infrared absorbing phthalocyanine, naphthalocyanine or rylene compound and an ethylene acid copolymer or an ionomer of an ethylene acid copolymer.

The present invention further provides a solar control laminate comprising an infrared absorbing phthalocyanine, naphthalocyanine or rylene compound and an ethylene acid copolymer or an ionomer of an ethylene acid copolymer.

The invention further provides a solar control laminate comprising a solar control layer comprised of an ethylene acid copolymer or an ionomer of an ethylene acid copolymer and a concentration of an infrared absorbing phthalocyanine, naphthalocyanine or rylene compound, wherein said solar control laminate has a layer thickness, a level of transmission of solar light and a level of transmission of visible light such that when the laminate is simulated using Simulation Method A, the simulated level of transmittance of visible light, $T_{vis-sim}$, and the simulated level of transmittance of solar light, $T_{sol-sim}$, for are such that for a phthalocyanine compound $0.45<T_{vis-sim}<0.80$ and $T_{sol-sim}<(0.450(T_{vis-sim})+0.22)$, for a naphthalocyanine compound $0.65<T_{vis-sim}<0.75$ and $T_{sol-sim}<(0.472(T_{vis-sim})-0.150)$, and for a rylene compound $0.65<T_{vis-sim}<0.75$ and $T_{sol-sim}<(1.719(T_{vis-sim})-0.801)$.

Further provided is a method of reducing the transmission of infrared radiation to the interior of a structure having an exterior window. The method comprises constructing a solar control laminate of the invention and inserting this solar control laminate into the exterior window of the structure.

DETAILED DESCRIPTION OF THE INVENTION

The definitions herein apply to the terms as used throughout this specification, unless otherwise limited in specific instances.

The term "solar control", as used herein, refers to reducing the intensity of any wavelength of radiation emitted by the sun. Preferably, in the present invention, the intensity of an infrared or near infrared wavelength is reduced and the intensity of visible wavelengths is substantially unchanged. Under these conditions, the transmission of heat is reduced, while visual transparency is maintained and the appearance of colored objects is not substantially distorted.

The term "(meth)acrylic acid" as used herein refers to acrylic acid or methacrylic acid, or to a mixture of acrylic acid and methacrylic acid. The term "(meth)acrylate" as used herein refers to a salt or ester of acrylic acid, methacrylic acid, or of a mixture of acrylic acid and methacrylic acid.

The terms "finite amount" and "finite value", as used herein, refer to an amount or value that is greater than zero.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors that will be apparent to those of skill in the art. In general, an amount, size, formulation, parameter or other quantity or characteristic is "about" or "approximate" whether or not expressly stated to be such.

The term "or", when used alone herein, is inclusive; more specifically, the phrase "A or B" means "A, B, or both A and B". Exclusive "or" is designated herein by terms such as "either A or B" and "one of A or B", for example.

When materials, methods, or machinery are described herein with the term "known to those of skill in the art", or a synonymous word or phrase, the term signifies that materials, methods, and machinery that are conventional at the time of filing the present application are encompassed by this description. Also encompassed are materials, methods, and machinery that are not presently conventional, but that will have become recognized in the art as suitable for a similar purpose.

All percentages, parts, ratios, and the like set forth herein are by weight, unless otherwise limited in specific instances.

Finally, the ranges set forth herein include their endpoints unless expressly stated otherwise. Further, when an amount, concentration, or other value or parameter is given as a range, one or more preferred ranges or a list of upper preferable values and lower preferable values, this is to be understood as specifically disclosing all ranges formed from any pair of any upper range limit or preferred value and any lower range limit or preferred value, regardless of whether such pairs are separately disclosed.

In one aspect, the present invention provides a solar control composition comprising an infrared absorbing phthalocyanine, naphthalocyanine or rylene compound and an ethylene acid copolymer or an ionomer of an ethylene acid copolymer.

The term "phthalocyanine compound", as used herein, refers to phthalocyanine and its ions, metallophthalocyanines, phthalocyanine derivatives and their ions, and metallated phthalocyanine derivatives. The term "phthalocyanine derivative", as used herein, refers to any compound having a phthalocyanine core. Stated alternatively, phthalocyanine derivatives include any molecule comprising a tetrabenzo[b, g, l, q]-5,10,15,20-tetraazaporphyrin moiety and having any number of peripheral substituents in place of any of the peripheral hydrogen atoms bound to the carbon atoms at the 1, 2, 3, 4, 8, 9, 10, 11, 15, 16, 17, 18, 22, 23, 24, or 25 positions of the phthalocyanine moiety. When more than one peripheral substituent is present, the peripheral substituents may be the same or different.

The term "naphthalocyanine compound", as used herein, refers to naphthalocyanine and its ions, metallonaphthalocyanines, naphthalocyanine derivatives and their ions, and metallated naphthalocyanine derivatives. The term "naphthalocyanine derivative", as used herein, refers to any compound having a naphthalocyanine core. Stated alternatively, naphthalocyanine derivatives include any molecule comprising a tetranaphthalo[b, g, l, q]-5,10,15,20-tetraazaporphyrin moiety and having any number of peripheral substituents in place of any of the peripheral hydrogen atoms bound to the carbon atoms of the naphthalocyanine moiety. When more than one peripheral substituent is present, the peripheral substituents may be the same or different.

The term "rylene compound", as used herein, refers to rylenes and their salts and derivatives. The term "rylene derivative", as used herein, refers to any compound having a rylene core. Stated alternatively, rylene derivatives include any molecule comprising a polycyclic aromatic hydrocarbon (PAH) moiety and having any number of peripheral substituents in place of any of the peripheral hydrogen atoms of the rylene. When more than one peripheral substituent is present, they may be the same or different.

Phthalocyanine, naphthalocyanine and rylene compounds suitable for use in the invention include any infrared absorbing phthalocyanine, naphthalocyanine or rylene compound. Some of the suitable phthalocyanine, naphthalocyanine and rylene compounds may function as dyes, i.e., they may be soluble in the solar control composition. Alternatively, others may function as pigments, i.e., they may be insoluble in the solar control composition.

Suitable phthalocyanine and naphthalocyanine compounds may be metallated, for example with monovalent metals including sodium, potassium and lithium; with divalent metals including copper, zinc, iron, cobalt, nickel, ruthenium, rhodium, palladium, platinum, manganese, tin, vanadium and calcium; or with trivalent metals, tetravalent metals, or metals of even greater valency.

In general, the charge of any metallated phthalocyanine or naphthalocyanine compound, aside from those containing a divalent metal, will be balanced by a cation or anion of appropriate charge that is often coordinated axially to the metal ion. Examples of suitable ions include, without limitation, halogen anions, metal ions, hydroxide anion, oxide anion ($O^{2-}$) and alkoxide anions. Preferred metallophthalocyanine and metallonaphthalocyanine compounds include, for example, $DAl^{3+}Cl^-$, $DAl^{3+}Br^-$, $DIn^{3+}Cl^-$, $DIn^{3+}Br^-$, $DIn^{3+}I^-$, $DSi^{4+}(Cl^-)_2$, $DSi^{4+}(Br^-)_2$, $DSi^{4+}(F^-)_2$, $DSn^{4+}(Cl^-)_2$, $DSn^{4+}(Br^-)_2$, $DSn^{4+}(F^-)_2$, $DGe^{4+}(Cl^-)_2$, $DGe^{4+}(Br^-)_2$, $DGe^{4+}(F^-)_2$, $DSi^{4+}(OH^-)_2$, $DSn^{4+}(OH^-)_2$, $DGe^{4+}(OH^-)_2$, $DV^{4+}O^{2-}$, and $DTi^{4+}O^{2-}$, wherein "D" refers to the dianion of phthalocyanine or naphthalocyanine or a peripherally substituted phthalocyanine or naphthalocyanine. Preferably, for the phthalocyanine compounds the metal comprises copper(II), nickel(II), or a mixture of copper(II) and nickel(II). Preferably, for the naphthalocyanine compounds the metal comprises copper(II), nickel(II), silicon(IV), or a mixture of two or more of copper (II), nickel(II) and silicon(IV).

Most preferably, the phthalocyanine and naphthalocyanine compounds are unmetallated.

Phthalocyanine and naphthalocyanine derivatives are preferred. Preferably, for the phthalocyanine derivatives one hydrogen atom of each of the four peripheral benzo rings is substituted, symmetrically or asymmetrically. Also preferably, the phthalocyanine derivatives may be substituted at the 1, 4, 8, 11, 15, 18, 22 and 25 positions, or at all sixteen of the peripheral carbon positions. Preferably, for the naphthalocyanine derivatives one or two hydrogen atoms of each of the four peripheral naphthalo rings are substituted, symmetrically or asymmetrically. Also preferably, the naphthalocyanine derivatives may be substituted at all twenty-four of the peripheral carbon positions.

Suitable substituents for phthalocyanine or naphthalocyanine derivatives include halogens, alkyl groups, alkoxyalkyl groups, alkoxyl groups, aryloxy groups and partially halogenated or perhalogenated alkyl group. The alkyl substituents may be linear or branched. Specific examples of preferred alkyl substituents include methyl, ethyl, n-propyl, isopropyl, n-butyl, isobutyl, sec-butyl, tert-butyl, neopentyl, isopentyl, neo-pentyl, 1,2-dimethylpropyl, n-hexyl, cyclohexyl, 1,3-dimethylbutyl, 1-iso-propylpropyl, 1,2-dimethylbutyl, n-heptyl, 1,4-dimethylpentyl, 2-methyl-1-isopropylpropyl, 1-ethyl-3-methylbutyl, n-octyl, 2-ethylhexyl, 3-methyl-1-isopropylbutyl, 2-methyl-1-isopropylbutyl, 1-t-butyl-2-methylpropyl, n-nonyl groups and mixtures thereof. Specific examples of alkoxyalkyl substituents include methoxymethyl, methoxyethyl, ethoxyethyl, propoxyethyl, butoxyethyl, methoxyethoxyethyl, ethoxyethoxyethyl, dimethoxymethyl, diethoxymethyl, dimethoxyethyl, diethoxyethyl groups and mixtures thereof. Specific examples of partially halogenated or perhalogenated alkyl substituents include chloromethyl, 2,2,2-trichloromethyl, trifluoromethyl, 1,1,1,3,3,3-hexafluoro-2-propyl groups and mixtures thereof. Specific examples of aryloxy substituents include phenoxy, 4-tert-butylphenyloxy, 4-cumylphenoxy, naphthyloxy groups and mixtures thereof.

More preferably, the phthalocyanine or naphthalocyanine compound comprises an alkoxy-substituted phthalocyanine or naphthalocyanine. Tetrasubstituted and octasubstituted alkoxy phthalocyanine or naphthalocyanine compounds are preferred. Examples of preferred alkoxyl groups include methoxyl, ethoxyl, n-propoxyl, iso-propoxyl, n-butoxyl, isobutoxyl, sec-butoxyl, tert-butoxyl, n-pentoxyl, iso-pentoxyl, neo-pentoxyl, 1,2-dimethylpropoxyl, n-hexyloxyl, iso-hexyloxyl, neo-hexyloxyl, cyclohexyloxyl, heptyloxyl, 1,3-dimethylbutoxyl, 1-iso-propylpropoxyl, 1,2-dimethylbutoxyl, 1,4-dimethylpentoxyl, 2-methyl-1-isopropylpropoxyl, 1-ethyl-3-methylbutoxyl, 2-ethylhexoxyl, 3-methyl-1-isopropylbutoxyl, 2-methyl-1-isopropylbutoxyl, 1-t-butyl-2-methyl propoxyl, n-octyloxyl, n-nonyloxyl, n-decyloxyl and mixtures thereof. Butoxyl groups are preferred.

Specific examples of preferred phthalocyanine compounds include aluminum 1,4,8,11,15,18,22,25-octabutoxy-29H, 31H-phthalocyanine triethylsiloxide; copper(II) 1,4,8,11,15, 18,22,25-octabutoxy-29H,31H-phthalocyanine; nickel(II) 1,4,8,11,15,18,22,25-octabutoxy-29H,31H-phthalocyanine; 1,4,8,11,15,18,22,25-octabutoxy-29H,31H-phthalocyanine; zinc 1,4,8,11,15,18,22,25-octabutoxy-29H,31H-phthalocyanine; copper(II) 2,3,9,10,16,17,23,24-octakis(octyloxy)-29H,31H-phthalocyanine; 2,3,9,10,16,17,23,24-octakis(octyloxy)-29H,31H-phthalocyanine; silicon 2,3,9,10,16,17,23, 24-octakis(octyloxy)-29H,31H-phthalocyanine dihydroxide; zinc 2,3,9,10,16,17,23,24-octakis(octyloxy)-29H,31H-phthalocyanine; and mixtures thereof.

Still more preferably, the phthalocyanine compound comprises an n-butoxyl substituted phthalocyanine compound. Again, tetrasubstituted and octasubstituted alkoxy phthalocyanine compounds are preferred. Specific examples of preferred butoxyl phthalocyanine compounds include aluminum 1,4,8,11,15,18,22,25-octabutoxy-29H,31H-phthalocyanine triethylsiloxide; copper(II) 1,4,8,11,15,18,22,25-octabutoxy-29H,31H-phthalocyanine; nickel(II) 1,4,8,11,15,18,22, 25-octabutoxy-29H,31H-phthalocyanine; 1,4,8,11,15,18,22, 25-octabutoxy-29H,31H-phthalocyanine; zinc 1,4,8,11,15, 18,22,25-octabutoxy-29H,31H-phthalocyanine; and mixtures thereof.

Specific examples of preferred naphthalocyanine compounds include, for example, aluminum 5,9,14,18,23,27,32, 36-octabutoxy-2,3-naphthalocyanine triethylsiloxide, copper(II) 5,9,14,18,23,27,32,36-octabutoxy-2,3-naphthalocyanine, nickel(II) 5,9,14,18,23,27,32,36-octabutoxy-2,3-naphthalocyanine, 5,9,14,18,23,27,32,36-octabutoxy-2,3-naphthalocyanine, zinc 5,9,14,18,23,27,32, 36-octabutoxy-2,3-naphthalocyanine and mixtures thereof.

Suitable rylene compounds are described in U.S. Pat. Nos. 5,405,962; 5,986,099; 6,124,458; 6,486,319; 6,737,159; 6,878,825; and 6,890,377; and U.S. Patent Appln. Publn. Nos. 2004/0049030 and 2004/0068114.

Preferable rylene compounds are unsubstituted or have up to 16 substituents. Preferred substituents include halogens, alkyl groups, alkoxyalkyl groups, alkoxide groups, aryloxy groups, arylthio groups, hetaryloxy groups, hetarylthio groups, and the like. Alkyl groups may be branched or unbranched. Substituent groups may be unsubstituted, or any number of the hydrogen atoms of the substituent groups may be substituted with halogens, for example. Specific examples of suitable peripheral substituents usable within the present invention are set forth in the above references.

More preferably, the rylene compound comprises a quaterrylene moiety. Still more preferably, the rylene compound is a peripherally substituted quaterrylene compound. The rylene compounds, Lumogen™ IR 765 and Lumogen™ IR 788, are suitable for use in the present invention and are commercially available from the BASF Corporation, Florham Park, N.J.

Alternatively, preferred phthalocyanine, naphthalocyanine and rylene compounds may be identified empirically, by exhibiting a favorable balance of optical properties. Transmission spectra are obtained for films containing a phthalocyanine, naphthalocyanine or rylene compound or laminates comprising such a film. The processed transmission spectrum of a given film or the measured transmission spectrum of a given laminate is used in a simulation program as described below to calculate the solar transmittance ($T_{sol\text{-}sim}$), the transmittance of all light in the solar spectrum, and the visible transmittance ($T_{vis\text{-}sim}$), the transmittance of light in the visible spectrum weighted by the sensitivity of the human eye to a simulated glass/ethylene acid copolymer or ionomer of an ethylene acid copolymer/glass laminate containing an interlayer with the processed transmission spectrum. The $T_{vis\text{-}sim}$ and the parameters of the glass and the ethylene acid copolymer or ionomer of an ethylene acid copolymer are used to calculate a concentration of the preferred phthalocyanine, naphthalocyanine or rylene compound in the an ethylene acid copolymer or an ionomer of an ethylene acid copolymer, such that for a preferred phthalocyanine compound $0.45 < T_{vis\text{-}sim} < 0.80$ and $T_{sol\text{-}sim} < (0.450(T_{vis\text{-}sim}) + 0.22)$, for a preferred naphthalocyanine compound $0.65 < T_{vis\text{-}sim} < 0.75$ and $T_{sol\text{-}sim} < (0.472(T_{vis\text{-}sim}) - 0.150)$, and for a preferred rylene compound $0.65 < T_{vis\text{-}sim} < 0.75$ and $T_{sol\text{-}sim} < (1.719(T_{vis\text{-}sim}) - 0.801)$. More preferred phthalocyanine compounds provide a $T_{sol\text{-}sim} < (0.708(T_{vis\text{-}sim}) + 0.003)$, and still more preferred phthalocyanine compounds provide a $T_{sol\text{-}sim} < (0.941(T_{vis\text{-}sim}) - 0.193)$ under the same conditions. More preferred rylene compounds provide a $T_{sol\text{-}sim} < (1.952(T_{vis\text{-}sim}) - 1.008)$, and still more preferred rylene compounds provide a $T_{sol\text{-}sim} < (2.083(T_{vis\text{-}sim}) - 1.125)$.

Other analyses may also define preferred phthalocyanine, naphthalocyanine or rylene compounds. For example, the phthalocyanine, naphthalocyanine or rylene compound and its calculated concentration may be adjusted to provide any visible light transmission that is desired. More specifically, automotive windshield uses generally require a visible light transmission of 0.75 or greater. However, architectural laminates may have significantly lower levels of visible light transmission, such as 0.50 and less.

When the solar control composition is intended for use as an infrared cutoff filter, the amount of phthalocyanine compound(s) may range from about 0.01 to about 80 wt %, preferably from about 0.01 to about 10 wt %, and more preferably from about 0.01 to about 5 wt %, the amount of naphthalocyanine compound(s) may range from about 0.01 to about 50 weight percent; preferably, from about 0.01 to about 10 weight percent; and more preferably from about 0.01 to about 5 weight percent, and the amount of rylene compound(s) may range from about 0.01 to about 80 weight percent; preferably, from about 0.01 to about 10 weight percent; and more preferably from about 0.01 to about 5 weight percent, based on the total weight of the solar control composition. When the solar control composition is intended for use as a concentrate, the amount of phthalocyanine compound(s) may range from about 30 to about 80 wt %, preferably from about 30 to about 50 wt %, and more preferably from about 35 to about 45 wt %, the amount of naphthalocyanine compound(s) may range from about 30 to about 50 weight percent; and more preferably from about 35 to about 45 weight percent, and the amount of rylene compound(s) may range from about 30 to about 80 weight percent; preferably from about 30 to about 50 weight percent; and more preferably from about 35 to about 45 weight percent, based on the total weight of the solar control composition.

The solar control composition and the solar control laminate of the invention comprise an ethylene acid copolymer. Suitable ethylene acid copolymers have a modulus that is between about 20,000 psi (138 MPa) and about 100,000 psi (690 MPa). Preferably, the modulus is between about 25,000 psi (173 MPa) and about 90,000 psi (621 MPa), and more preferably, between about 30,000 psi (207 MPa) and about 80,000 psi (207 MPa).

Suitable ethylene acid copolymers comprise from about 0.1 weight percent to about 30 weight percent of one or more copolymerized acid comonomers, preferably from about 10 weight percent to about 25 weight percent of the copolymerized acid comonomer(s), and more preferably from about 15 weight percent to about 25 weight percent of the copolymerized acid comonomer(s), based on the total weight of the polymer. The amount of copolymerized acid comonomer(s) in an ethylene acid copolymer affects the copolymer's adhesion to glass.

Preferred acid comonomer(s) include (meth)acrylic acid, itaconic acid, maleic acid, maleic anhydride, fumaric acid, and monomethyl maleic acid. More preferably, the acid comonomer is (meth)acrylic acid.

The acid groups of the copolymerized ethylene acid copolymers are preferably at least partially neutralized with one or more metal cations to form an ionomer. As used herein, and unless otherwise limited in context, the term "ethylene acid copolymer" refers to the ethylene acid copolymer in its free acid form, in its completely neutralized form, or in a partially neutralized form.

The metal cations may be monovalent, divalent, trivalent, or of even higher valence. Preferred monovalent ions include ions of sodium, potassium, lithium, silver, mercury, and copper. Preferred divalent ions include ions of beryllium, magnesium, calcium, strontium, barium, copper, cadmium, mercury, tin, lead, iron, cobalt, nickel, and zinc. Preferred trivalent ions include ions of aluminum, scandium, iron, and yttrium. Preferred ions of even higher valence include ions of titanium, zirconium, hafnium, vanadium, tantalum, tungsten, chromium, cerium, and iron. Preferably, when the metal cation is tetravalent or of higher valence, complexing agents, such as stearate, oleate, salicylate, and phenolate groups are included, as described in U.S. Pat. No. 3,404,134. Ions of sodium, lithium, magnesium, zinc, aluminum, and combinations of two or more thereof are more preferred. Sodium ions, zinc ions, and mixtures of sodium and zinc ions are still more preferred. Generally, sodium ions are associated with high optical clarity, and zinc ions are associated with high moisture resistance. Preferably, from about 0 to about 100 percent, more preferably from about 10 to about 100 percent, and still more preferably from about 20 to about 80 percent of the acid groups in the ethylene acid copolymers are neutralized.

The ethylene acid copolymers may optionally contain other copolymerized comonomers. Preferred copolymerized comonomers include alkyl(meth)acrylates, wherein the alkyl group is a branched or unbranched moiety including up to about 20 carbons. The alkyl groups may be unsubstituted, or substituted with one or more hydroxyl groups. Preferred alkyl groups include methyl, ethyl, propyl, isopropyl, butyl, isobutyl, tert-butyl acrylate, tert-butyl, octyl, undecyl, octadecyl, dodecyl, 2-ethylhexyl, isobornyl, lauryl, 2-hydroxyethyl acrylate, and 2-hydroxyethyl. Other preferred copolymerized comonomers include glycidyl (meth)acrylate, poly(ethylene glycol) (meth)acrylate, poly(ethylene glycol) methyl ether (meth)acrylate, poly(ethylene glycol) behenyl ether (meth)

acrylate, poly(ethylene glycol) 4-nonylphenyl ether (meth)acrylate, poly(ethylene glycol) phenyl ether (meth)acrylate, dialkyl maleate (C1 to C4 alkyl), dialkyl fumarate (C1 to C4 alkyl), dimenthyl fumarate, vinyl acetate, vinyl propionate and mixtures thereof. More preferred copolymerized comonomers include, without limitation, methyl (meth)acrylate, butyl (meth)acrylate, glycidyl (meth)acrylate, vinyl acetate, and mixtures of two or more thereof.

Provided that the ethylene acid copolymer maintains a modulus of greater than 20,000 psi (138 Mpa), the other copolymerized comonomer(s) may be present in a finite amount up to about 50 weight percent, more preferably up to about 25 weight percent, and still more preferably up to about 10 weight percent, based on the total weight of the ethylene acid copolymer.

Ethylene acid copolymers suitable for use in the present invention may be polymerized and neutralized as described, for example, in U.S. Pat. Nos. 3,404,134; 5,028,674; 6,500,888; and 6,518,365. Recycled ethylene acid copolymers may also be used, together with or in place of virgin materials.

The solar control composition may also comprise one or more plasticizers, dispersants, surfactants, chelating agents, coupling agents, UV absorbers, hindered amine light stabilizers (HALS), processing aides, flow enhancing additives, lubricants, pigments, dyes, flame retardants, impact modifiers, nucleating agents to increase crystallinity, antiblocking agents such as silica, thermal stabilizers, UV stabilizers, adhesives, primers, crosslinking agents, hardening agents, pH adjusting agents, antifoaming agents inorganic infrared absorbents, organic infrared absorbents, and wetting agents. Suitable amounts of these additives and methods of incorporating the additives into polymer compositions will be available to those of skill in the art. See, for example, "Modern Plastics Encyclopedia", McGraw-Hill, New York, N.Y. 1995.

The process to produce the solar control composition includes the steps of combining the ethylene acid copolymer with the phthalocyanine, naphthalocyanine or rylene compound(s) and optionally other ingredients and mixing the combined ingredients.

Preferably, the phthalocyanine, naphthalocyanine or rylene compound(s) are dispersed in the ethylene acid copolymer. Dispersion, the process of deagglomerating the as-supplied phthalocyanine, naphthalocyanine or rylene compound(s) to primary particles, may be accomplished by any suitable means. The clarity of the articles containing the phthalocyanine, naphthalocyanine or rylene compound(s), as demonstrated through haze measurements, for example, will suffer if the phthalocyanine, naphthalocyanine or rylene compound(s) are not sufficiently deagglomerated.

Preferably, the dispersion process is a high shear melt mixing process in which the molten ethylene acid copolymer is combined with the phthalocyanine, naphthalocyanine or rylene compound(s) and any optional components of the composition that may be present. Suitable high shear mixing equipment are static mixers, rubber mills, Brabender mixers, Buss kneaders, single screw extruders, twin screw extruders, and heated or unheated two-roll mills.

The precise processing conditions will depend on the physical properties of the ethylene acid copolymer, however, and on the amount and type of phthalocyanine, naphthalocyanine or rylene compound(s) and optional other ingredients to be incorporated into the ethylene acid copolymer. Those skilled in the art will be able to determine appropriate processing conditions and equipment. For example, International Appln. Publn. No. WO 01/00404 describes a method of dispersing nanoparticles in a polymeric material using a heated two-roll mill. This method is more preferred when the ethylene acid copolymer or the solar control composition has a melt viscosity too high for efficient processing on other equipment such as static mixers, rubber mills, Brabender mixers, Buss kneaders, single screw extruders, and twin screw extruders.

The amount of the phthalocyanine, naphthalocyanine or rylene compound(s) in the solar control composition affects the efficiency of the deagglomeration process. For optimal clarity the particles are preferably approximately nanoparticles. The melt viscosity generally increases with the amount of phthalocyanine, naphthalocyanine or rylene compound(s). The upper limit of the amount of phthalocyanine, naphthalocyanine or rylene compound(s) incorporated within the ethylene acid copolymer will be determined in part by the highest melt viscosity that can be tolerated by the selected dispersion process and equipment.

Conversely, an inadequately low amount of phthalocyanine, naphthalocyanine or rylene compound(s) will not provide sufficiently high melt viscosity. As a result, the shear stress will also be inadequately low, and the as-supplied phthalocyanine, naphthalocyanine or rylene compound(s) will not be efficiently deagglomerated to their primary particle size. For this reason, it may be desirable to make a well-dispersed concentrate of the phthalocyanine, naphthalocyanine or rylene compound(s) in the ethylene acid copolymer or ionomer, and then add further neat ethylene acid copolymer or ionomer to the concentrate. In this way, the concentration of the phthalocyanine, naphthalocyanine or rylene compound(s) may be adjusted to the level required for the desired reduction in the transmission of solar radiation.

The ethylene acid copolymer may be dried and powdered or pelletized prior to any mixing step. The ethylene acid copolymer may also be mixed with the phthalocyanine, naphthalocyanine or rylene compound(s) and the optional components in a dry blend, typically referred to as a "pellet blend" or "powder blend", for feeding into the mixing equipment. Alternatively, the ethylene acid copolymer, the phthalocyanine, naphthalocyanine or rylene compound(s) and the optional components may be individually fed through two or more different feeders.

In a typical extrusion process, the ethylene acid copolymer, the phthalocyanine, naphthalocyanine or rylene compound(s), and the optional components are fed into the back or "feed" section of the extruder. It may be advantageous, however, to feed the ethylene acid copolymer, the phthalocyanine, naphthalocyanine or rylene compound(s), and the optional components into two or more different locations of the extruder. For example, the ethylene acid copolymer may be fed into the back section of the extruder while the phthalocyanine, naphthalocyanine or rylene compound(s) are fed into the front of the extruder near the die plate. The extruder temperature profile preferably allows the ethylene acid copolymer to melt under the processing conditions. The screw design preferably also imparts shear stress, and therefore heat, as it mixes the molten ethylene acid copolymer with the phthalocyanine, naphthalocyanine or rylene compound(s) and other optional components. Preferably, the melt processing temperature of the ethylene acid copolymer or of the phthalocyanine, naphthalocyanine or rylene composition is within the range of about 50° C. to about 300° C.

In a preferred process of the invention, a relatively large amount of phthalocyanine, naphthalocyanine or rylene compound(s) is blended with a relatively small amount of a matrix material to form a concentrate that has a relatively high amount of phthalocyanine, naphthalocyanine or rylene compound(s). The concentrate is blended with an ethylene acid copolymer, which may be the same as or different from the matrix material, to produce a solar control composition with the relatively low amount of phthalocyanine compound(s) necessary to efficiently absorb the desired amount of infrared radiation. The suitable and preferred processing methods and conditions to form the concentrates are as set forth above with respect to processes for compounding the solar control compositions. In some preferred processes, the solar control composition is produced in situ in a manufacturing process. For example, the phthalocyanine, naphthalocyanine or rylene concentrate may be added directly, as an additive, into the production processes described below for shaped articles, such as films and sheets.

The matrix material into which the phthalocyanine, naphthalocyanine or rylene compound(s) are incorporated is preferably a polymer. Essentially any polymer may find utility as the matrix material. Preferably, the matrix material is transparent to visible light. Preferred polymeric matrix materials include poly(ethylene terephthalate), polycarbonate, polypropylene, polyethylene, cyclic polyolefins, norbornene polymers, polystyrene, syndiotactic polystyrene, styrene-acrylate copolymers, acrylonitrile-styrene copolymers, poly(ethylene naphthalate), polyethersulfone, polysulfone, polyamides, including nylons, poly(urethanes), acrylics, cellulose acetates, cellulose triacetates, vinyl chloride polymers, polyvinyl fluoride, polyvinylidene fluoride, poly(ethylene-co-vinyl acetate); ethyl acrylic acetate (EM); ethyl methacrylate (EMAC); metallocene-catalyzed polyethylene; plasticized poly(vinyl chloride); ISD resins; polyurethane; acoustically modified poly(vinyl chloride), an example of which is commercially available from the Sekisui Company; plasticized poly(vinyl butyral); acoustically modified poly(vinyl butyral); ethylene acid copolymers; and copolymers thereof and combinations thereof. The matrix material may comprise recycled material in addition to or instead of virgin material.

Preferably, for optimal clarity, the matrix material is equivalent to or at least miscible with the ethylene acid copolymer. However, it is contemplated that it may be advantageous to utilize a lower melting matrix material, particularly in conjunction with higher melting ethylene acid copolymers. The clarity of the final film, for example, will not be unduly harmed because of the relative thinness of the film and due to the low amount of the matrix material in the final film composition.

The concentrate may include one or more optional additives, such as those set forth above as suitable for use in the solar control compositions.

The solar control composition may include from about 0.0001 weight percent to about 75 weight percent of phthalocyanine, naphthalocyanine or rylene concentrate and from about 99.9999 weight percent to about 25 weight percent of the ethylene acid copolymer; preferably, from about 0.0001 weight percent to about 40 weight percent of phthalocyanine, naphthalocyanine or rylene concentrate and from about 99.9999 weight percent to about 60 weight percent of the ethylene acid copolymer; more preferably, from about 0.0001 weight percent to about 20 weight percent of phthalocyanine, naphthalocyanine or rylene concentrate and from about 99.9999 weight percent to about 80 weight percent of the ethylene acid copolymer; and still more preferably, from about 0.0001 weight percent to about 10 weight percent of phthalocyanine, naphthalocyanine or rylene concentrate and from about 99.9999 weight percent to about 90 weight percent of the ethylene acid copolymer.

The process to produce the solar control compositions from the phthalocyanine, naphthalocyanine or rylene concentrates is preferably a high shear melt mixing process. Preferably, such a process involves high shear mixing of the molten ethylene acid copolymer resin with the concentrate and the optional components, if present. The concentrate may optionally be dried and powdered or pelletized prior to any mixing step. In the mixing steps, the concentrate may be handled in any manner that is also suitable for the ethylene acid copolymer.

Preferably, a phthalocyanine, naphthalocyanine or rylene concentrate in a matrix material is blended with an ethylene acid copolymer as part of one of the film or sheet formation processes described below.

Alternatively, the phthalocyanine, naphthalocyanine or rylene compound(s) may be added to a plasticizer, or, alternatively, a solvent, in an amount of about 0.01 to about 80 weight percent. Preferably, the phthalocyanine, naphthalocyanine or rylene compound(s) are deagglomerated through processes that use equipment such as an attrition mill, a sand mill, a ball mill, a vibration mill, a jet mill, an atomizer deagglomerator, a three-roll mill and the like. The resulting suspension or dispersion may then be added to the ethylene acid copolymer, as noted above, preferably in a high shear melt mixing process.

Further provided by the present invention are shaped articles comprising the solar control composition of the invention. The shaped articles are preferably coatings, films, multilayer films, sheets, or multilayer sheets.

Preferably, the shaped article is a solar control layer. The solar control layer may be coating, a film, a sheet, a multilayer film or a multilayer sheet. The difference between a film and a sheet is the thickness; however, there is no industry standard that defines the thickness at which a film becomes a sheet. For purposes of this invention, a film has a thickness of about 10 mils (0.25 millimeters (mm)), or less. Preferably, the film has a thickness of about 0.5 mils (0.012 mm) to about 10 mils (0.25 mm). More preferably, the film has a thickness of about 1 mil (0.025 mm) to about 5 mils (0.13 mm). For automotive applications, the film thickness may be preferably within the range of about 1 mil (0.025 mm) to about 4 mils (0.1 mm). For purposes of this invention, a polymeric sheet has a thickness of about 10 mils (0.25 mm), or greater. Preferably, the polymeric sheet has a thickness of about 15 mils (0.38 mm), or greater. More preferably, the polymeric sheet has a thickness of about 30 mils (0.75 mm), or greater, based on enhanced penetration strength of the laminates produced therefrom. Still more preferably, the polymeric sheet has a thickness of about 50 mils (1.25 mm), or greater, based on even further enhanced penetration strength of the laminates produced therefrom. Many end uses in the current environment require the polymeric sheet interlayer to be even thicker. Interlayers thicker than 60 mils (1.50 mm), 90 mils (2.25 mm), and even thicker than 120 mils (3.00 mm), are becoming commonplace within the marketplace. Sheets of this thickness or greater are usable within the present invention.

Generally, the films will include higher concentrations of the phthalocyanine, naphthalocyanine or rylene particles than the sheets, because approximately the same level of energy absorption is desired in most applications, and films are thinner than sheets. Cf. Baer's Law. In general, however, the amount of phthalocyanine, naphthalocyanine or rylene compound(s) in the film may range from about 0.001 to about 80 wt %, preferably from about 0.01 to about 10 wt %, and more preferably from about 0.01 to about 5 wt % based on the total weight of the film.

Films and sheets of the invention may be made by any suitable process. A description of certain preferred means is set forth in detail below. The compositions of the invention may be used as intermediates in the fabrication of the solar control layer. For example, the solar control composition may be added as a concentrate to a pellet blend with a resin to form a solar control sheet. Other uses of the compositions of the invention to form the solar control layers of the invention will be apparent to those of skill in the art.

Thin films, for example, may be formed by dipcoating as described in U.S. Pat. No. 4,372,311, by compression molding as described in U.S. Pat. No. 4,427,614, by melt extrusion as described in U.S. Pat. No. 4,880,592, by melt blowing as described in U.S. Pat. No. 5,525,281, or by other suitable processes. Polymeric sheets may be formed by extrusion, calendering, solution casting or injection molding, for example. One of ordinary skill in the art will be able to identify appropriate process parameters based on the polymeric composition and on the method used for sheet or film formation.

Preferably, however, the films of the present invention are formed by solution casting or extrusion, and the sheets of the present invention are formed by extrusion. Extrusion is a particularly preferred method of forming long, continuous products, such as films and sheets.

When a melt processing method, such as extrusion or injection molding, is used, the melt processing temperature of the solar control compositions is preferably from about 50° C. to about 300° C., and more preferably from about 100° C. to about 250° C. The solar control compositions of the invention are generally characterized by excellent thermal stability, which allows them to be processed at high temperatures that reduce the effective melt viscosity.

The sheets and films of the invention include multilayer laminates having two or more layers at least one of which comprises phthalocyanine, naphthalocyanine or rylene compound(s). The multilayer film and sheet structures may be formed by any suitable means, such as, for example, coextrusion, blown film, dipcoating, solution coating, blade, puddle, air-knife, printing, Dahlgren, gravure, flexo, powder coating, spraying, or other art processes. The individual layers may be joined together by heat, adhesive and/or tie layer, for example. Preferably, the multilayer films are produced through extrusion casting processes.

Many film and sheet formation methods, and extrusion processes in particular, can be combined with a variety of post-extruding operations for expanded versatility. Such post-forming operations include altering round to oval shapes, blowing the film to different dimensions, machining, punching, stretching or orienting, rolling, calendering, coating, embossing, printing and radiation such as E-beam treatment to increase the Vicat softening point. The post extruding operations, together with the polymeric composition, the method of forming the polymer, and the method of forming the film or sheet, affect properties such as clarity, shrinkage, tensile strength, elongation at break, impact strength, dielectric strength and constant, tensile modulus, chemical resistance, melting point, heat deflection temperature, and adhesion.

For example, films and sheets formed by any method may be oriented, uniaxially or biaxially, by stretching in one or both of the machine and transverse directions after formation according to any suitable methods.

Preferably, one or both surfaces of the solar control layer is treated to enhance adhesion. Essentially any adhesive or primer is suitable for use in the present invention. When using an adhesive or primer, one of ordinary skill in the art will be able to identify appropriate coating thicknesses and process parameters based on the composition of the solar control layer, the adhesive or primer, and the coating process.

The solar control layer may also have a hard coat layer formed from an ultraviolet (UV) curing resin on one or both surfaces to protect the outer polymeric layers from scratching, abrasion, and like insults. Any suitable hard coat formulation may be employed. One preferred hard coat is described in U.S. Pat. No. 4,027,073.

The sheets and films of the present invention may have smooth surfaces. Preferably, however, sheets to be used as interlayers within laminates have at least one roughened surface to effectively allow most of the air to be removed from between the surfaces of the laminate during the lamination process.

The solar control layer may comprise a film or sheet that is coated on one or both surfaces with a coating comprised of phthalocyanine, naphthalocyanine or rylene compound(s). The coating may result from the application of a coating solution. The term "coating solution" encompasses phthalocyanine, naphthalocyanine or rylene compound(s) dissolved, dispersed or suspended in one or more polymer solutions, one or more polymer precursor solutions, one or more emulsion polymers, or mixtures of one or more polymer solution, polymer precursor solution, or emulsion polymer.

The coating solution may include one or more solvents that dissolve, partially dissolve, disperse, or suspend the binder. The solvent or solvent blends are selected by considering such properties as the solubility of the polymer, surface tension of the resulting coating solution and evaporation rate of the coating solution, the polarity and surface characteristics of the phthalocyanine, naphthalocyanine or rylene compound (s) to be used and the chemical nature of any dispersants and other additives, the viscosity of the coating, and compatibility of the surface tension of the coating with the surface energy film material. The solvent or solvent blend should also be chemically inert to the polymer binder material(s).

Alternatively, the solvent(s) may be partially or entirely replaced with a plasticizer. The plasticizer-based coating solutions, suspensions or dispersions may then be treated analogously to the solvent-based coating solutions.

The thickness of the coating is dependent in part on the amount of solvent in the coating solution and that the amount of phthalocyanine, naphthalocyanine or rylene compound(s) in the coating solution is determined largely by the amount of binder and solvent in the coating solution and by the amount of phthalocyanine, naphthalocyanine or rylene compound(s) desired in the coating.

To prepare a coating solution, the phthalocyanine, naphthalocyanine or rylene compound(s), the binder polymer, the optional additives and the solvent are mixed to homogeneously distribute the phthalocyanine, naphthalocyanine or rylene compound(s) throughout the polymer solution. Alternatively, the polymer and the phthalocyanine, naphthalocyanine or rylene compound(s) may be kneaded together to form a concentrate, which may, in turn, be added to the solvent, for example, as described in Intl. Appln. Publn. No. WO 01/00404 and U.S. Pat. No. 5,487,939. Regardless of how the coating solution is formed, it may be milled, such as through ball milling, roll milling, sand grinding milling, a paint shaker, a kneader, a dissolver, an ultrasonic dispersing machine, and the like, to deagglomerate the phthalocyanine, naphthalocyanine or rylene compound(s).

Alternatively, the phthalocyanine-, naphthalocyanine- or rylene-containing coating may be an actinic radiation-curable coating comprising one or more radically polymerizable monomers and/or oligomers. Suitable radiation-curable matrix materials are described, for example, in U.S. Pat. No. 5,504,133.

Alternatively, the phthalocyanine-, naphthalocyanine- or rylene-containing coating may include a photo-cationic-curable matrix material as described, for example, in U.S. Pat. No. 6,191,884. Generally, photo-cationically-curable matrix materials are epoxide and/or vinyl ether materials.

Alternatively, the phthalocyanine-, naphthalocyanine- or rylene-containing coating compositions may be cured through heating processes. When a heating process-based cure is desired, it is preferable to incorporate an appropriate radical polymerization initiator such as azobisisobutyronitrile in the coating composition in place of a photoinitiator. Preferred heat-curing binders include, for example, thermoset resins, such as melamine resin, polyurethane resin, silicone resin, silicone-modified resin and mixtures thereof.

Preferably, the binder or film-forming material of the phthalocyanine-, naphthalocyanine- or rylene-containing coating is organic, e.g., a polymer. However, it may also be an inorganic material, such as a siloxane.

Preferably, the dry or cured coating will be less than or equal to 10 mils (0.25 mm) thick, more preferably between about 0.1 mil (0.0025 mm) and about 5 mils (0.13 mm). Thicker coatings with a thickness of about 20 mils (0.50 mm) or greater can also be formed.

The polymeric film or sheet may be coated by any suitable coating process. Extrusion is a particularly preferred method of coating polymeric films and sheets. Melt extrusion of coatings onto substrates is described, for example, in U.S. Pat. Nos. 5,294,483; 5,475,080; 5,611,859; 5,795,320; 6,183,814 and 6,197,380. Alternatively, a coating solution may be cast onto a polymeric film or sheet and dried to form the solar control film. Solution casting generally produces a more consistent coating thickness than melt extrusion.

Alternatively, a coating solution may be cast onto a polymeric film or sheet and dried to form the solar control film. Solution casting generally produces a more consistent coating thickness than melt extrusion. In a typical process, the coating solution is filtered to remove dirt or large particles and cast from a slot die onto a moving preformed polymeric substrate, dried, and cooled if necessary. The coating solution thickness, immediately after casting, is typically five to ten times that of the finished coating, depending on the amount of solvent in the coating solution. The coating may then be finished in a like manner to the extruded coating.

One preferred method of forming a solar control layer is transfer printing. Suitable transfer printing processes generally include coating a solar control composition onto a releasable substrate, such as coated paper or polyester film. When dried or cured, the coating, i.e., the solar control layer, is contacted with a surface of a polymeric substrate or a rigid sheet, and subsequently transferred from the releasable substrate onto the substrate. If necessary, the uncoated side of the releasable substrate may be heated, to facilitate the release and adhesion of the coating to the substrate. General information about transfer printing is set forth in European patent No. 0 576 419.

Also provided by the present invention is a solar control laminate comprising a solar control layer of the invention. In addition, the solar control laminate may comprise at least one additional layer, which may be a film, a sheet, or a coating on a film or a sheet. The additional layer may be a solar control layer or a solar control film. When the additional layer is a sheet, it may be a rigid or a flexible sheet. In certain preferred embodiments, the solar control laminates comprise one or more rigid sheets, a solar control layer, and at least one additional layer. Different physical properties are often desired from films and sheets. For example, a sheet may be required to be self-supporting or a film may require more resistance to puncture or tearing. Accordingly, in the additional layers as in the solar control layers, different polymeric resins are preferred for use at different thicknesses.

Preferred films for use as additional film layers include oriented and unoriented polyester films, polycarbonate films, polyurethane films and polyvinyl chloride films. Preferably, the additional film layer is biaxially oriented poly(ethylene terephthalate). Preferred sheets for use as additional sheet layers include sheets comprising polyvinyl butyral compositions, acoustic polyvinyl acetal compositions, acoustic polyvinyl butyral compositions, ethylene vinyl acetate compositions, thermoplastic polyurethane compositions, polyvinyl chloride copolymer compositions and ethylene acid copolymer compositions and ionomers derived therefrom.

Glass is a preferred rigid sheet. The term "glass" as used herein includes window glass, plate glass, silicate glass, sheet glass, float glass, colored glass, specialty glass which may, for example, include ingredients to control solar heating, glass coated with sputtered metals such as silver, for example, glass coated with antimony tin oxide (ATO) and/or indium tin oxide (ITO), E-glass, Solex™ glass (PPG Industries of Pittsburgh, Pa.) and Toroglass™. A typical glass type is 90 mil thick annealed flat glass, and it is preferable to orient the tin side of the glass to the interlayer to achieve optimal adhesion. Alternatively, the rigid sheet may be a rigid polymeric sheet comprised of a polycarbonate, acrylics, polyacrylate, cyclic polyolefins, metallocene-catalyzed polystyrene and mixtures or combinations thereof. Preferably, the rigid sheet is transparent to visible radiation. A metal or ceramic plate may be used as a rigid sheet, however, if transparency or clarity is not required in the solar control laminate.

The additional layer(s) may provide additional attributes such as acoustical barrier properties or may have functional coatings containing organic infrared absorbers. In applications in which electrical conductivity is not disadvantageous, the functional coatings may be sputtered metal layers.

Preferred solar control laminates may comprise a solar control layer and a polymeric film; a solar control layer and a polymeric sheet; a solar control layer and two polymeric sheets; a solar control layer, a polymeric film, and one or two polymeric sheets.

Preferred solar control laminates of the invention include structures comprising adjacent layers as follows: polymeric film/solar control layer; polymeric sheet/solar control layer; rigid sheet/solar control layer; rigid sheet/polymeric sheet/solar control layer; first rigid sheet/polymeric sheet/solar control layer/additional polymeric sheet/second rigid sheet; rigid sheet/polymeric sheet/solar control layer/additional polymeric sheet/additional film; rigid sheet/additional polymeric sheet/additional film/polymeric sheet/solar control layer; rigid sheet/polymeric sheet/solar control layer/second polymeric sheet/additional film/third polymeric sheet/second rigid sheet; and first rigid sheet/polymeric sheet/solar control layer/additional polymeric sheet/second rigid sheet/second additional polymeric sheet/additional film/third additional polymeric sheet/third rigid sheet. In each of the above embodiments, "/" indicates adjacent layers. Moreover, the second layer of any film or sheet may be the same as or different from the first layer of that film or sheet. Likewise, the third layer may be the same as or different from the first and second layers of that film or sheet, and so on. Furthermore, in some preferred embodiments of the invention, the adjacent layers are directly laminated to each other so that they are adjoining or, more preferably, contiguous.

Any suitable process may be used to produce the solar control laminates of the present invention. Those skilled in the art are aware that different processes and conditions may be desirable, depending on the composition of the layers in the solar control laminate and on whether a rigid or flexible laminate is desired.

For example, a polymeric sheet and a solar control film may be bonded to each other and/or to one or more additional layers in a nip roll process. The additional layer(s) are fed along with the film or sheet of the invention through one or more calendar roll nips in which the two layers are subjected to moderate pressure and, as a result, form a weakly bonded laminate. Generally, the bonding pressure will be within the range of about 10 psi (0.7 kg/cm$^2$) to about 75 psi (5.3 kg/cm$^2$), and preferably it is within the range of about 25 psi (1.8 kg/cm$^2$) to about 30 psi (2.1 kg/cm$^2$). Typical line speeds are within the range of about 5 feet (1.5 m) to about 30 feet (9.2 m) per minute. The nip roll process may be conducted with or without moderate heating, which may be supplied by an oven or by a heated roll, for example. When heated, the polymer surfaces should achieve a temperature sufficient to promote temporary fusion bonding, that is, to cause the surfaces of the polymeric sheet or film to become tacky. Suitable surface temperatures for the preferred polymeric films and sheets of the invention are within the range of about 50° C. to about 120° C., and preferably the surface temperature is about 65° C. After fusion bonding, the laminate may be passed over one or more cooling rolls to ensure that the laminate is sufficiently strong and not tacky when taken up for storage. Process water cooling is generally sufficient to achieve this objective.

In another typical procedure to make a solar control laminate, an interlayer comprising a solar control laminate of the invention, such as an interlayer with a polymeric sheet/solar control film/polymeric sheet structure, is positioned between two glass plates to form a glass/interlayer/glass pre-press assembly. Preferably, the glass plates have been washed and dried. Air is drawn out from between the layers of the pre-press assembly using a vacuum bag (see, e.g., U.S. Pat. No. 3,311,517), a vacuum ring, or another apparatus capable of maintaining a vacuum of approximately 27 to 28 inches (689 to 711 mm Hg). The pre-press assembly is sealed under vacuum, then placed into an autoclave for heating under pressure. With increasing order of preference, the temperature in the autoclave is from about 130° C. to about 180° C., from about 120° C. to about 160° C., from about 135° C. to about 160° C., or from about 145° C. to about 155° C. The pressure in the autoclave is preferably about 200 psi (15 bar). With increasing order of preference given, the pre-press assembly is heated in the autoclave for about 10 to about 50 minutes, about 20 to about 45 minutes, about 20 to about 40 minutes, or about 25 to about 35 minutes. After the heating and pressure cycle, the air in the autoclave is cooled without adding additional gas to maintain pressure in the autoclave. After about 20 minutes of cooling, the excess air pressure is vented and the laminates are removed from the autoclave.

Alternatively, a nip roll process may be used in conjunction with an autoclave to produce solar control laminates. In one such process, the glass/interlayer/glass assembly is heated in an oven at or to between about 80° C. and about 120° C., preferably between about 90° C. and about 100° C., for about 30 minutes. Thereafter, the heated glass/interlayer/glass assembly is passed through a set of nip rolls so that the air in the void spaces between the glass and the interlayer is expelled. The edges of the structure are sealed at this point to produce a pre-press assembly that may be processed under vacuum in an autoclave, as described above, to produce a solar control laminate.

Solar control laminates may also be produced by non-autoclave processes. Several suitable non-autoclave processes are described in U.S. Pat. Nos. 3,234,062; 3,852,136; 4,341,576; 4,385,951; 4,398,979; 5,536,347; 5,853,516; 6,342,116; 5,415,909; in U.S. Patent Appln. Publn. No. 2004/0182493; in European Patent No. 1 235 683 B1; and in International Patent Appln. Publn. Nos. WO 91/01880 and WO 03/057478 A1. Generally, non-autoclave processes include heating the pre-press assembly and the application of vacuum, pressure or both. For example, the pre-press assembly may be passed through heating ovens and nip rolls.

For architectural uses and for uses in transportation vehicles, a preferred glass laminate has two layers of glass and a single interlayer comprising a solar control laminate of the invention that is directly laminated to both glass layers. Preferably, the interlayer also comprises a second polymeric sheet and each polymeric sheet is in contact with one of the glass layers. In these applications, the glass laminate preferably has an overall thickness of about 3 mm to about 30 mm. The interlayer typically has a thickness of about 0.38 mm to about 4.6 mm, and each glass layer usually is at least 1 mm thick. Also preferred are multilayered solar control laminates such as a five layer laminate of glass/interlayer/glass/interlayer/glass, a seven layer laminate of glass/interlayer/glass/interlayer/glass/interlayer/glass, and laminates with additional interlayer/glass units.

EXAMPLES AND COMPARATIVE EXPERIMENTS

The examples are presented for illustrative purposes only, and are not intended to limit the scope of the invention in any manner.

Moduli

All moduli are determined according to ASTM D 638-03 (2003).

Room Temperature

The term "room temperature" as used herein refers to a temperature of 21° C.+/−5° C.

Standard Solutions of a Phthalocyanine Compound

A phthalocyanine compound (approximately 2.0 mg, unless otherwise noted) was added to a mixture of N,N-dimethyl formamide (12.00 g+/−0.02 g) and methanol (4.00 g+/−0.05 g). Where noted, the solution contained dichloromethane in addition to or in place of the methanol. The mixture was stirred at room temperature until the phthalocyanine compound ceased to dissolve. Remaining solids, if any, were removed by decantation. Polyvinyl butyral was added to the resulting solution (Mowital™ B30T, 4.00 g+/−0.02 g, Kuraray Co., Ltd., Osaka, Japan) and the solution was stirred at room temperature until the polyvinyl butyral was dissolved.

Standard Stabilizing Solution

A standard stabilizing solution was made by mixing, at room temperature, Tinuvin™ 571 (0.40 g, CAS 23328-53-2, Ciba Specialty Chemicals, Basel, Switzerland), bis(1-octyloxy-2,2,6,6-tetramethyl-4-piperidyl)sebacate (0.40 g, CAS 129757-67-1, Tinuvin™ 123 from Ciba Specialty Chemicals), 4-(1,1,3,3-tetramethylbutyl)phenol (0.08 g, CAS 140-66-9), N,N-dimethylformamide, (120.00 g), and methanol (40.00 g).

Standard Procedure for Preparation of Phtalocyanine-, Naphthalocyanine- or Rylene-Containing Layers on Polyester Films A standard solution of a phthalocyanine compound or a solution of a naphthalocyanine or rylene compound was equilibrated to room temperature and cast onto an untreated biaxially oriented polyester film. Two films were cast with 6 inch Gardiner blades, one having a 10 mil blade gap and a second having a 20 mil blade gap. The drawdown thicknesses of the two resulting films are referred to as "10 mils" and "20 mils", respectively, and the two films as "10 mil film" and "20 mil film", respectively. The two cast films were dried overnight at room temperature and ambient humidity, then heated in an oven at 75° C. for 30 min before testing for solar control properties. Where noted, some films were also heated on a hot plate at 70° C. to 90° C. for 5 or 10 min before or after being heated in the oven.

Standard Transfer Printing Procedure

The coated surface of a coated polyester film prepared according to the standard procedure described above was contacted with a surface of a SentryGlas® Plus ethylene/methacrylic acid copolymer sheet (2 inches by 2 inches (5.1 cm by 5.1 cm) by 30 mils (0.76 mm) thick, (E.I. du Pont de Nemours & Co. of Wilmington, Del., hereinafter "DuPont")). An iron preheated to 100° C. was placed on the uncoated surface of the polyester film and pressure was applied by hand. After 1 minute, the iron was removed and the polyester release film was stripped away to provide a SentryGlas® Plus sheet that is coated with the layer containing the phthalocyanine, naphthalocyanine or rylene compound.

Standard Procedure for Lamination

A pre-press assembly, in which all the layers in the laminate are cut to the same size and stacked in the desired order, is placed into a vacuum bag and heated at 90° C. to 100° C. for 30 minutes to remove any air contained between the layers of the pre-press assembly. The pre-press assembly is heated at 135° C. for 30 minutes in an air autoclave at a pressure of 200 psig (14.3 bar). The air is then cooled without adding additional gas so that the pressure in the autoclave is allowed to decrease. After 20 minutes of cooling, when the air temperature is less than about 50° C., the excess pressure is vented and the laminate is removed from the autoclave.

Solar Control Properties of Films

Solar and visible transmittance values were calculated on simulated laminates using the following methods. Transmission spectra were obtained on phthalocyanine-, naphthalocyanine- or rylene-containing layers supported on polyethylene terephthalate films using a Varian Cary 5000 uv/vis/nir spectrometer. A resulting spectrum was processed to compensate for the reflectance from the front and rear surfaces due to refractive index mismatch with air thereby simulating the transmission spectrum of the film as it would appear if the film were embedded between two layers of material with a refractive index that was matched to the sample. The compensated spectrum was then entered as an interlayer material into Lawrence Berkeley National Laboratory's Optics software package version 5.1 (Maintenance Pack 2) equipped with International Glazing Database No. 14.0.

Simulation Method A

In Method A, laminates were simulated using (from the outboard lite to the inboard lite) a generic 6 mm thick clear glass (clear_6.dat), the compensated interlayer data produced above, a 15 mil thick layer of Butacite® NC010 (15PVB6.dup), and a 3 mm inboard lite of generic 3 mm thick clear glass (clear_3.dat). In the subsequent examples, when it is stated that the spectral data is "multiplied" by a given factor, this indicates that simulated laminates were made using more than one of the phthalocyanine- or naphthalocyanine-containing layers in series. The software then simulated the transmission and reflection spectra for the simulated laminate using method W5_NFRC_2003 and calculated the visible ($T_{vis-sim}$) and solar ($T_{sol-sim}$) transmittances. The spectral data for the simulated laminates were saved and subsequently imported into Lawrence Berkeley National Laboratory's Window 5.2 Software version 5.2.12. The calculated $T_{vis-sim}$ and $T_{sol-sim}$ for films are tabulated in Table 1.

Simulation Method B

Method B is identical to method A, except that the simulated laminate does not include the generic 6 mm thick clear glass (clear_6.dat). The calculated $T_{vis-sim}$ and $T_{sol-sim}$ for films are tabulated in Table 1.

Solar Control Properties of Laminates

Spectra were obtained according to the procedures of ASTM test methods E424 and E308, and ISO test methods 9050:2003 and 13837 using a Perkin Elmer Lambda 19 Spectrophotometer (PerkinElmer, Inc., Wellesley, Mass.). These measurements were used directly, as described immediately above, to calculate simulated transmittances. The calculated $T_{vis-sim}$ and $T_{sol-sim}$ for laminates are tabulated in Table 2. The $T_{vis-sim}$ and $T_{sol-sim}$ for plaques were calculated using this laminate procedure and are set forth in Table 1.

Example E1

Coated polyester films were prepared according to the standard procedure using a standard solution of aluminum phthalocyanine hydroxide, (0.0020 g, hydroxy (29H,31H-phthalocyaninato)aluminum, CAS 18155-23-2, dye content about 85%).

Comparative Experiment CE1

Coated polyester films were prepared according to the standard procedure using a standard solution of nickel(II) phthalocyanine tetrasulfonic acid, tetrasodium salt, (0.0021 g, CAS 27835-99-0).

Example E2

Coated polyester films were prepared according to the standard procedure using a standard solution of gallium(III) phthalocyanine hydroxide, (0.0021 g, CAS 63371-84-6, dye content about 75%).

Example E3

Coated polyester films were prepared according to the standard procedure using a standard solution of gallium(III) phthalocyanine hydroxide, (0.0080 g, CAS 63371-84-6, dye content about 75%). Dichloromethane (4.00 g) was used in place of methanol and an additional amount of dichloromethane (10.83 g) was added together with polyvinyl butyral.

Example E4

Coated polyester films were prepared according to the standard procedure using a standard solution of zinc phthalocyanine, (0.0020 g, CAS 14320-04-8, dye content about 97%). The 10 mil film was dried at room temperature overnight, heated at 90° C. on a hot plate for 5 min, and then heated to 75° C. in an oven for 0.50 hour. The 20 mil film was heated to 75° C. in an oven overnight and then heated at 80° C. on a hot plate for 10 min.

Comparative Experiment CE2

Coated polyester films were prepared according to the standard procedure using a standard solution of a deagglomerated concentrate of Green Pigment 7 in Mowital™ B30T polyvinyl butyral, (0.0050 g, 40 wt % Green Pigment 7, based on total weight of concentrate). The 20 mil film was allowed to dry at room temperature overnight, heated to 75° C. in an oven overnight, and then heated to 80° C. for 10 min.

Comparative Experiment CE3

Coated polyester films were prepared according to the standard procedure using a standard solution of a deagglomerated concentrate of Green Pigment 7 in Mowital™ B30T polyvinyl butyral, (0.06 g, 40 wt % Green Pigment 7, based on total weight of concentrate). However, the amounts of N,N-dimethyl formamide, methanol and Mowital™ B30T polyvinyl butyral used were 18.00 g, 6.00 g and 5.9460 g, respectively. The polyester films were flame treated prior to coating with the phthalocyanine solution.

Comparative Experiment CE4

Two SentryGlas® Plus ethylene/methacrylic acid copolymer sheets and the 20 mil coated polyester film of Example 3 were conditioned overnight at a temperature of 72° F. and 23% relative humidity. A glass/conditioned SentryGlas® Plus sheet/conditioned coated film/conditioned SentryGlas® Plus sheet/glass pre-press assembly consisting of, in order, a clear annealed float glass plate layer, the first conditioned SentryGlas® Plus sheet layer, the conditioned coated film of Example 3, the second conditioned SentryGlas® Plus sheet layer and a second clear annealed float glass plate layer (each layer measuring 4 inches by 4 inches (10.2 cm by 10.2 cm); glass layers 2.5 mm thick; SentryGlas® Plus sheets 15 mils (0.38 mm) thick) was laminated according to the standard lamination procedure.

Comparative Experiment CE5

Coated polyester films were prepared according to the standard procedure using a standard solution of a deagglomerated concentrate of Blue Pigment 15:4 in Mowital™ B30T polyvinyl butyral, (0.0050 g, 40 wt % Blue Pigment 15:4, based on total weight of concentrate). The 20 mil film was also heated on a hot plate at 80° C. for 10 min after being heated in the oven.

Comparative Experiment CE6

Coated polyester films were prepared according to the standard procedure using a standard solution of a deagglomerated concentrate of Blue Pigment 15:4 in Mowital™ B30T polyvinyl butyral, (0.061 g, 40 wt % Blue Pigment 15:4, based on total weight of concentrate). However, the amounts of N,N-dimethyl formamide, methanol and Mowital™ B30T polyvinyl butyral used were 18.01 g, 6.00 g and 5.9457 g, respectively. The polyester films were flame treated prior to coating with the phthalocyanine solution.

Example E5

Coated polyester films were prepared according to the standard procedure using a standard solution of tetrakis(4-cumylphenoxy) phthalocyanine, (0.0080 g, CAS 83484-76-8). Dichloromethane (4.02 g) was used in place of methanol. The polyester films were flame treated prior to coating with the phthalocyanine solution.

Example E6

Coated polyester films were prepared according to the standard procedure using a standard solution of manganese (II) phthalocyanine, (0.0202 g, CAS 14325-24-7). Dichloromethane (4.02 g) was used in place of methanol. The polyester films were flame treated prior to coating with the phthalocyanine solution.

Example E7

Coated polyester films were prepared according to the standard procedure using a standard solution of manganese (II) phthalocyanine, (0.0081 g, CAS 14325-24-7). Dichloromethane (4.04 g) was used in place of methanol.

Example E8

Coated polyester films were prepared according to the standard procedure using a standard solution of manganese (III) phthalocyanine chloride, (0.0080 g, CAS 53432-32-9).

Example E9

Coated polyester films were prepared according to the standard procedure using a standard solution of aluminum phthalocyanine chloride, (0.0161 g, CAS 14154-42-8).

Example E10

Coated polyester films were prepared according to the standard procedure using a standard solution of aluminum phthalocyanine chloride, (0.0081 g, CAS 14154-42-8). Dichloromethane (4.03 g) was used in place of methanol.

Example E11

Coated polyester films were prepared according to the standard procedure using a standard solution of Pro-Jet™ 800 W, (0.0081 g, Avecia).

Example E12

Coated polyester films were prepared according to the standard procedure using a standard solution of Pro-jet™ 800 NP, (0.0081 g, Avecia).

Example E13

Coated polyester films were prepared according to the standard procedure using a standard solution of Excolor™ IR-10A, (0.0080 g, Nippon Shokubai Company, Osaka, Japan).

Example E14

Coated polyester films were prepared according to the standard procedure using a standard solution of Excolor™ IR-12, (0.0081 g, Nippon Shokubai Company).

Example E15

Coated polyester films were prepared according to the standard procedure using a standard solution of Excolor™ IR-14, (0.0081 g, Nippon Shokubai Company).

Example E16

Coated polyester films were prepared according to the standard procedure using a standard solution of Excolor™ TX-EX-906B, (0.0082 g, Nippon Shokubai Company).

Example E17

Coated polyester films were prepared according to the standard procedure using a standard solution of Excolor™ TX-EX-910B, (0.0080 g, Nippon Shokubai Company).

Example E18

Coated polyester films were prepared according to the standard procedure using a standard solution of OPM-868 (0.0081 g, Toyo Ink Manufacturing Company, Tokyo, Japan).

Example E19

A solution of OPM-868 (0.0160 g, Toyo Ink Manufacturing Company) was prepared by adding the OPM-868 to an aliquot of standard stabilizing solution (16.0893 g). After the OPM-868 was dissolved, polyvinyl butyral (3.9823 g, Mowital™ B30T) was added and the mixture was stirred at room temperature until the polyvinyl butyral was dissolved.

Coated polyester films were prepared according to the standard procedure using the OPM-868 solution.

Example E20

Coated polyester films were prepared using the procedure described in Example E19 except that the polyester films were flame treated prior to coating with the phthalocyanine solution.

Example E21

Coated polyester films were prepared according to the standard procedure using a standard solution of OPM-249 (0.0080 g, Toyo Ink Manufacturing Company).

Example E22

A solution of OPM-249 (0.0161 g, Toyo Ink Manufacturing Company) was prepared by adding the OPM-868 to an aliquot of standard stabilizing solution (16.0900 g). After the OPM-249 was dissolved, polyvinyl butyral (3.9823 g, Mowital™ B30T) was added and the mixture was stirred at room temperature until the polyvinyl butyral was dissolved.

Coated polyester films were prepared according to the standard procedure using the OPM-249 solution.

Example E23

Coated polyester films were prepared using the procedure described in Example E22 except that the polyester films were flame treated prior to coating with the phthalocyanine solution.

Example E24

A SentryGlas® Plus ethylene/methacrylic acid copolymer sheet and the 10 mil coated polyester film of Example 23 were conditioned overnight at 23% relative humidity and at a temperature of 72° F. A glass/conditioned SentryGlas® Plus sheet/conditioned coated film/Teflon® film (DuPont)/glass pre-press assembly consisting of, in order, a clear annealed float glass plate layer, the conditioned SentryGlas® Plus sheet layer, the conditioned coated film of Example 23 with its coated surface in contact with the SentryGlas® Plus sheet, a Teflon® film, and a second clear annealed float glass plate layer (each layer measuring 3 inches by 3 inches (7.6 cm by 7.6 cm); glass layers 3 mm thick; SentryGlas® Plus sheet 30 mils (75 mm) thick) was laminated according to the standard lamination procedure. Removal of the Teflon® film and the second glass layer provided a glass/conditioned SentryGlas® Plus/conditioned coated polyester film laminate.

Example E25

A SentryGlas® Plus sheet and the 10 mil coated polyester film of Example 23 were conditioned as described in Example E24 and used to prepare a green glass/conditioned SentryGlas® Plus/conditioned coated polyester film laminate using the procedure described in Example E24. The only difference was that a Solex™ green glass plate was used in place of the first clear annealed float glass plate.

Example E26

Coated polyester films were prepared according to the standard procedure using a standard solution of YKR-3080 (0.0081 g, Yamamoto Chemicals, Inc., Osaka, Japan).

Example E27

Coated polyester films were prepared according to the standard procedure using a standard solution of YKR-3080 (0.0081 g, Yamamoto Chemicals). Dichloromethane (4.03 g) was used in place of methanol.

Example E28

Coated polyester films were prepared according to the standard procedure using a standard solution of YKR-3020 (0.0079 g, Yamamoto Chemicals).

Example E29

Coated polyester films were prepared according to the standard procedure using a standard solution of YKR-3020 (0.0081 g, Yamamoto Chemicals). Dichloromethane (4.03 g) was used in place of methanol.

Example E30

Coated polyester films were prepared according to the standard procedure, using a standard solution of 1,4,8,11,15,18,22,25-octabutoxy-29H,31H-phthalocyanine, (0.0060 grams, CAS 116453-73-7).

Example E31

Coated polyester films were prepared according to the standard procedure, using a standard solution of 1,4,8,11,15,18,22,25-octabutoxy-29H,31H-phthalocyanine, (0.0060 grams, CAS 116453-73-7). However, the amounts of N,N-dimethyl formamide, methanol and Mowital™ B30T polyvinyl butyral used were 18.01 g, 6.00 g and 5.9786 g, respectively. The polyester films were flame treated prior to coating with the phthalocyanine solution.

Example E32

A solution of 1,4,8,11,15,18,22,25-octabutoxy-29H,31H-phthalocyanine, (0.0060 grams, CAS 116453-73-7) was prepared by adding the phthalocyanine compound to an aliquot of standard stabilizing solution (16.0888 g). After the phthalocyanine compound was dissolved, polyvinyl butyral (3.9036 g, Mowital™ B30T) was added and the mixture was stirred at room temperature until the polyvinyl butyral was dissolved.

Coated polyester films were prepared according to the standard procedure using the phthalocyanine solution.

Example E33

A solution of 1,4,8,11,15,18,22,25-octabutoxy-29H,31H-phthalocyanine, (0.0090 grams, CAS 116453-73-7) was prepared by adding the phthalocyanine compound to an aliquot of standard stabilizing solution (24.1328 g). After the phthalocyanine compound was dissolved, polyvinyl butyral (5.8557 g, Mowital™ B30T) was added and the mixture was stirred at room temperature until the polyvinyl butyral was dissolved.

Coated polyester films were prepared according to the standard procedure using the phthalocyanine solution. The polyester films were flame treated prior to coating with the phthalocyanine solution.

Example E34

A SentryGlas® Plus sheet, a Butacite® polyvinyl butyral sheet (DuPont) and the coated 20 mil polyester film of Example E33 were conditioned overnight at a temperature of 72° F. and 23% relative humidity. A glass/conditioned Butacite® sheet/conditioned coated polyester film/conditioned SentryGlas® Plus sheet/glass pre-press assembly consisting of, in order, a clear annealed float glass plate layer, the conditioned Butacite® sheet layer, the conditioned coated polyester film of Example E33, the conditioned SentryGlas® Plus sheet layer and a second clear annealed float glass plate layer (each layer measuring 2 inches by 4 inches (5.6 cm by 10.2 cm); glass layers 2.5 mm thick; Butacite® sheet and SentryGlas® Plus sheet 15 mils (0.38 mm) thick) was laminated according to the standard lamination procedure.

Example E35

Coated polyester films were prepared according to the standard procedure using a standard solution of copper(II) 1,4,8,11,15,18,22,25-octabutoxy-29H,31H-phthalocyanine, (0.0080 grams, CAS 107227-88-3).

Example E36

A solution of copper(II) 1,4,8,11,15,18,22,25-octabutoxy-29H,31H-phthalocyanine (0.0080 grams, CAS 107227-88-3) was prepared by adding the phthalocyanine compound to an aliquot of standard stabilizing solution (16.0878 g). After the phthalocyanine compound was dissolved, polyvinyl butyral (3.9877 g, Mowital™ B30T) was added and the mixture was stirred at room temperature until the polyvinyl butyral was dissolved.

Coated polyester films were prepared according to the standard procedure using the phthalocyanine solution.

Example E37

Coated polyester films were prepared according to the standard procedure using a standard solution of copper(II) 1,4,8,11,15,18,22,25-octabutoxy-29H,31H-phthalocyanine, (0.0020 g, CAS 107227-88-3).

Example E38

Coated polyester films were prepared according to the standard procedure using a standard solution of copper(II) 1,4,8,11,15,18,22,25-octabutoxy-29H,31H-phthalocyanine, (0.0020 g, CAS 107227-88-3). However, the amounts of N,N-dimethyl formamide, methanol and Mowital™ B30T polyvinyl butyral used were 18.01 g, 6.00 g and 5.9780 g, respectively. The polyester films were flame treated prior to coating with the phthalocyanine solution.

Example E39

Two SentryGlas® Plus sheets and the coated 20 mil film of Example E38 were conditioned overnight at a temperature of 72° F. and 23% relative humidity. A glass/conditioned SentryGlas® Plus sheet/conditioned coated polyester film/conditioned SentryGlas® Plus sheet/glass pre-press assembly consisting of, in order, a clear annealed float glass plate layer, the first conditioned SentryGlas® Plus sheet layer, the conditioned coated polyester film of Example E38, the second conditioned SentryGlas® Plus sheet layer and a second clear annealed float glass plate layer (each layer measuring 4 inches by 4 inches (10.2 cm by 10.2 cm)); glass layers 2.5 mm thick; SentryGlas® Plus sheets 15 mils (0.38 mm) thick) was laminated according to the standard lamination procedure.

Example E40

Coated polyester films were prepared according to the standard procedure using a standard solution of nickel(II) 1,4,8,11,15,18,22,25-octabutoxy-29H,31H-phthalocyanine, (0.0020 grams, CAS 155773-71-0). The resulting films were dried at room temperature overnight, heated to 90° C. for 10 min on a hot plate, and then heated at 75° C. in an oven for 0.5 hour.

Example E41

A solution of nickel(II) 1,4,8,11,15,18,22,25-octabutoxy-29H,31H-phthalocyanine (0.0080 grams, CAS 155773-71-0) was prepared by adding the phthalocyanine compound to an aliquot of standard stabilizing solution (16.0090 g). After the phthalocyanine compound was dissolved, polyvinyl butyral (3.9025 g, Mowital™ B30T) was added and the mixture was stirred at room temperature until the polyvinyl butyral was dissolved.

Coated polyester films were prepared according to the standard procedure using the phthalocyanine solution.

Example E42

Coated polyester films were prepared according to the standard procedure using a standard solution of nickel(II) 1,4,8,11,15,18,22,25-octabutoxy-29H,31H-phthalocyanine, (0.0020 grams, CAS 155773-71-0). However, the amounts of N,N-dimethyl formamide, methanol and Mowital™ B30T polyvinyl butyral used were 18.00 g, 6.00 g and 5.9785 g, respectively. The polyester films were flame treated prior to coating with the phthalocyanine solution. The resulting films were dried at room temperature overnight, heated to 90° C. for 10 min on a hot plate, and then heated at 75° C. in an oven for 0.5 hour.

Comparative Experiment CE8

A SentryGlas® Plus sheet and an uncoated poly(ethylene terephthalate) film were conditioned as described in Example E24 and used to prepare a glass/conditioned SentryGlas® Plus sheet/conditioned uncoated polyester film laminate using the procedure described in Example E24.

Example E43

A SentryGlas® Plus sheet and the coated polyester 20 mil film of Example E42 were conditioned as described in Example E24 and used to prepare a glass/conditioned SentryGlas® Plus sheet/conditioned coated polyester film laminate using the procedure described in Example E24.

Example E44

Three SentryGlas® Plus sheet and the coated 10 mil polyester films of Examples E33 and E42 were conditioned overnight at a temperature of 72° F. and 23% relative humidity. A glass/conditioned SentryGlas® Plus sheet/conditioned coated polyester film/conditioned SentryGlas® Plus sheet/conditioned coated polyester film/conditioned SentryGlas® Plus sheet/glass pre-press assembly consisting of, in order, a clear annealed float glass plate layer, the first conditioned SentryGlas® Plus sheet layer, the conditioned coated polyester film of Example E33, the second conditioned SentryGlas® Plus sheet layer, the conditioned coated polyester film of Example E42, the third conditioned SentryGlas® Plus sheet layer, and a second clear annealed float glass plate layer (each layer measuring 4 inches by 4 inches (10.2 cm by 10.2 cm); glass layers 2.5 mm thick; SentryGlas® Plus sheets 15 mils (0.38 mm) thick) was laminated according to the standard lamination procedure.

Comparative Experiment CE9

Poly(ethylene-co-methacrylic acid) (50 g, 19 wt % methacrylic acid, melt index 2.6 g/10 min) and copper(II) phthalocyanine (0.01 g) were mixed in a Brabender Plasti-Corder™ PL2000 (C. W. Brabender Instruments, Inc., South Hackensack, N.J.). The Brabender Plasti-Corder™ PL2000 was preheated to 150° C. and the polymer was melted with a screw speed of 40 rpm. The mixture was compounded for 0.5 hours at 150° C. and the resulting product was collected, cooled and pressed into plaques measuring 2.5 inches by 6 inches (64 mm by 152 mm) with thicknesses of 1.65 mm and 1.68 mm. The press was set at a temperature of 150° C. and a pressure of 1000 psi.

Comparative Experiment CE10

A glass/plaque/glass pre-press assembly consisting of, in order, a clear annealed float glass plate layer, the 1.65 mm thick plaque of Comparative Experiment CE9 layer and a second clear annealed float glass plate layer (each layer measuring 2.5 inches by 6 inches (6.4 cm by 15.2 cm); glass layers 2.5 mm thick) was laminated according to the standard lamination procedure.

Comparative Experiment CE11

The 1.68 mm thick plaque of Comparative Experiment CE9A was used to prepare a glass/plaque/glass laminate using the procedure described in Comparative Experiment CE10.

Example E45

Plaques were prepared according to the procedure of Comparative Experiment CE9 using a mixture of poly(ethylene-co-methacrylic acid) (100 g, 19 wt % methacrylic acid, melt index 2.6 g/10 min) and 1,4,8,11,15,18,22,25-octabutoxy-29H,31H-phthalocyanine (0.01 g, CAS 116453-73-7). The plaques had thicknesses ranging from 1.65 mm to 0.84 mm.

Example E46

A 1.65 mm thick plaque of Example E45 was used to prepare a glass/plaque/glass laminate using the procedure described in Comparative Experiment CE10.

Example E47

A 1.63 mm thick plaque of Example E45 was used to prepare a glass/plaque/glass laminate using the procedure described in Comparative Experiment CE10.

Example E48

A 0.94 mm thick plaque of Example E45 was used to prepare a glass/plaque/glass laminate using the procedure described in Comparative Experiment CE10.

Example E49

A 0.89 mm thick plaque of Example E45 was used to prepare a glass/plaque/glass laminate using the procedure described in Comparative Experiment CE10.

Example E50

A 0.84 mm thick plaque of Example E45 was used to prepare a glass/plaque/glass laminate using the procedure described in Comparative Experiment CE10.

Example E51

The laminate of Example E50 was reproduced.

Example E52

A 0.84 mm thick plaque of Example E45 was used to prepare a glass/plaque/glass laminate using the procedure described in Comparative Experiment CE10.

Example E53

A green glass/plaque/polyester film/Teflon® film/glass pre-press assembly consisting of, in order, a Solex™ green glass plate layer, a 0.86 mm thick plaque of Example E45 layer, a biaxially oriented poly(ethylene terephthalate) film, a Teflon® film, and a clear annealed float glass plate layer (each layer measuring 2.5 inches by 6 inches (6.4 cm by 15.2 cm); green glass layer 3.1 mm thick; clear glass layer 2.5 mm thick) was laminated according to the standard lamination procedure. Removal of the Teflon® film and the second glass layer provided a glass/plaque/polyester film laminate.

Example E54

Plaques were prepared according to the procedure of Comparative Experiment CE9 using a mixture of poly(ethylene-co-methacrylic acid) (100 g, 19 wt % methacrylic acid, melt index 2.6 g/10 min), Tinuvin® 328 (0.08 g, Ciba Specialty Chemicals) and 1,4,8,11,15,18,22,25-octabutoxy-29H,31H-phthalocyanine (0.01 g, CAS 116453-73-7). The only difference was that the Carver melt press was set at a temperature of 130° C. The plaques had thicknesses ranging from 1.63 mm to 0.89 mm.

Example E55

A 0.89 mm thick plaque of Example 54 was used to prepare to prepare a glass/plaque/glass laminate using the procedure described in Comparative Experiment CE10.

Example E56

The laminate of Example E55 was reproduced.

Example E57

A 1.68 mm thick plaque of Example 54 was used to prepare to prepare a glass/plaque/glass laminate using the procedure described in Comparative Experiment CE10.

Example E58

The laminate of Example 55 was reproduced.

Example E59

A 1.55 mm plaque of Example 54 was used to prepare to prepare a glass/plaque/glass laminate using the procedure described in Comparative Experiment CE10.

Example E60

A 1.63 mm plaque of Example 54 was used to prepare to prepare a glass/plaque/glass laminate using the procedure described in Comparative Experiment CE10.

Example E61

Coated polyester films were prepared according to the standard procedure using a standard solution of nickel(II) 1,4,8,11,15,18,22,25-octabutoxy-29H,31H-phthalocyanine (0.0120 g, CAS 155773-71-0). However, the amounts of N,N-dimethyl formamide, methanol and Mowital™ B30T polyvinyl butyral used were 18.00 g, 6.01 g and 5.9841 g, respectively. Two 20 mil polyester films were coated. One film was untreated and the other was flame treated prior to coating with the phthalocyanine solution.

Example E62

A solution of copper(II) 1,4,8,11,15,18,22,25-octabutoxy-29H,31H-phthalocyanine (0.0122 g, CAS 107227-88-3) was prepared by adding the metallophthalocyanine to an aliquot of standard stabilizing solution (16.0887 g). After the metallophthalocyanine was dissolved, polyvinyl butyral (3.9009 g, Mowital™ B30T) was added and the mixture was stirred at room temperature until the polyvinyl butyral was dissolved.

Coated polyester films were prepared according to the standard procedure using the metallophthalocyanine solution. The polyester films were primed with a poly(allyl amine) primer prior to coating with the metallophthalocyanine solution.

Example E63

Coated polyester films were prepared according to the standard procedure using a standard solution of nickel(II) 1,4,8,11,15,18,22,25-octabutoxy-29H,31H-phthalocyanine (0.0123 g, CAS 155773-71-0). However, the amounts of N,N-dimethyl formamide, methanol and Mowital™ B30T polyvinyl butyral used were 18.01 g, 6.01 g and 5.9905 g, respectively. Two 20 mil polyester films were coated. One film was untreated and the other was flame treated prior to coating with the phthalocyanine solution. The polyester films were primed with a poly(allyl amine) primer prior to coating with the phthalocyanine solution.

Example E64

A mixture of 2,3-naphthalocyanine (0.0081 grams, CAS 23627-89-6, dye content ca. 95 percent) was prepared by adding the naphthalocyanine compound to dichloromethane (4.00 grams) and mixing at room temperature. N,N-dimethylformamide (12.00 grams) was added to the mixture. A small amount of insoluble residue was removed. To the resulting solution was added Mowital™ B30T polyvinyl butyral (3.9982 grams) and the resulting mixture was mixed until a solution was formed at room temperature.

Coated poly(ethylene terephthalate) films were prepared according to the standard procedure using the naphthalocyanine compound solution.

Example E65

The coated 10 mil film of Example E64 was transfer printed onto a SentryGlas® Plus sheet according to the standard transfer printing procedure.

The transfer-printed SentryGlas® Plus sheet and a SentryGlas® Plus sheet were conditioned overnight at a temperature of 72° F. and 23% relative humidity. A glass/conditioned transfer-printed SentryGlas® Plus sheet/conditioned SentryGlas® Plus sheet/glass pre-press assembly consisting of, in order, a clear annealed float glass plate layer, the conditioned transfer-printed SentryGlas® Plus sheet layer, the conditioned SentryGlas® Plus sheet layer (with the coated surface of the transfer-printed SentryGlas® Plus sheet in contact with the surface of the SentryGlas® Plus sheet) and a second clear annealed float glass plate layer (each layer measuring 2 inches by 2 inches (5.1 cm by 5.1 cm); glass layers 2.3 mm thick; SentryGlas® Plus sheets 30 mils (0.76 mm) thick) was laminated according to the standard lamination procedure.

Example E66

Two SentryGlas® Plus sheets and the coated 20 mil poly(ethylene terephthalate) film prepared in Example E64 were conditioned overnight at a temperature of 72° F. and 23% relative humidity. A glass/conditioned SentryGlas® Plus sheet/conditioned coated poly(ethylene terephthalate) film/conditioned SentryGlas® Plus sheet/glass pre-press assembly consisting of, in order, a clear annealed float glass plate layer, the first conditioned SentryGlas® Plus sheet layer, the conditioned coated poly(ethylene terephthalate) film of Example E64, the second conditioned SentryGlas® Plus sheet layer and a second clear annealed float glass plate layer (each layer measuring 2 inches by 2 inches (5.1 cm by 5.1 cm); glass layers 2.3 mm thick; SentryGlas® Plus sheets 60 mils (1.52 mm) thick) was laminated according to the standard lamination procedure.

Example E67

A mixture of 2,3-naphthalocyanine (0.0080 grams, CAS 23627-89-6, dye content ca. 95 percent) was prepared by adding the naphthalocyanine compound to dichloromethane (4.02 grams) and mixing at room temperature. An aliquot (16.0955 grams) of the standard stabilizing solution was added to the mixture. A small amount of insoluble residue was removed. To the resulting mixture was added Mowital™ B30T polyvinyl butyral (3.9287 grams) and the resulting mixture was mixed until a solution was formed at room temperature.

Coated poly(ethylene terephthalate) films were prepared according to the standard procedure using the naphthalocyanine compound solution.

Example E68

The coated 10 mil film of Example E67 was transfer printed onto a SentryGlas® Plus polyvinyl butyral sheet according to the standard transfer printing procedure. The transfer-printed SentryGlas® Plus sheet was conditioned overnight at a temperature of 72° F. and 23% relative humidity. A glass/conditioned transfer-printed SentryGlas® Plus sheet/glass pre-press assembly consisting of, in order, a clear annealed float glass plate layer, the conditioned transfer-printed SentryGlas® Plus sheet layer and a second clear annealed float glass plate layer (each layer measuring 2 inches by 2 inches (5.1 cm by 5.1 cm); glass layers 2.3 mm thick; SentryGlas® Plus sheet 60 mils (1.52 mm) thick)) was laminated according to the standard lamination procedure.

Example E69

A SentryGlas® Plus sheet and the coated 20 mil poly(ethylene terephthalate) film of Example E67 were conditioned as described in Example E24 and used to prepare a glass/conditioned SentryGlas® Plus sheet/conditioned coated poly(ethylene terephthalate) film laminate using the procedure described in Example E24. The only differences were that each layer measured 2 inches by 2 inches (5.1 cm by 5.1 cm), the glass layers were 2.3 mm thick and the SentryGlas® Plus sheet was 60 mils (1.52 mm) thick.

Example E70

A solution of nickel(II) 5,9,14,18,23,27,32,36-octabutoxy-2,3-naphthalocyanine (0.0080 grams, CAS 155773-70-9, dye content ca. 98 percent) was prepared by adding the naphthalocyanine compound to dichloromethane (16.00 grams) and mixing at room temperature. To the resulting solution was added Mowital™ B30T polyvinyl butyral, (3.9929 grams) and dichloromethane (5.17 grams). 0.50 hour prior to film casting, an additional amount of dichloromethane (4.15 grams), was added to the solution and the resulting solution was mixed at room temperature until casting.

A 10 mil coated poly(ethylene terephthalate) film was prepared according to the standard procedure using the naphthalocyanine compound solution.

Example E71

The coated 10 mil film of Example E70 was transfer printed onto a SentryGlas® Plus polyvinyl butyral sheet according to the standard transfer printing procedure. The transfer-printed SentryGlas® Plus sheet and an uncoated poly(ethylene terephthalate) film were conditioned as described in Example E24 and used to prepare a glass/conditioned transfer-printed SentryGlas® Plus sheet/conditioned poly(ethylene terephthalate) film laminate using the procedure described in Example E24. The only differences were that each layer measured 2 inches by 2 inches (5.1 cm by 5.1 cm), the glass layers were 2.3 mm thick and the SentryGlas® Plus sheet was 60 mils (1.52 mm) thick.

Example E72

A SentryGlas® Plus sheet and the 10 mil coated poly(ethylene terephthalate) film prepared in Example E70 were conditioned as described in Example E24 and used to prepare a green glass/conditioned Butacite®/biaxially oriented poly(ethylene terephthalate) film laminate using the procedure described in Example E24. The only differences were that a Solex™ green glass plate was used in place of the first clear annealed float glass plate, each layer measured 2 inches by 2 inches (5.1 cm by 5.1 cm), the annealed float glass layer was 2.3 mm thick and the SentryGlas® Plus sheet was 60 mils (1.52 mm) thick.

Example E73

A solution of silicon 2,3-naphthalocyanine bis(trihexylsilyloxide), (0.0081 grams, CAS 92396-88-8) was prepared by adding the naphthalocyanine compound to a mixture of N,N-dimethylformamide (12.00 grams), and methanol (4.00 grams) and mixing at room temperature until dissolved. A small amount of insoluble residue was removed. To the resulting solution was added Mowital™ B30T polyvinyl butyral (3.9904 grams), and the resulting mixture was mixed until a solution was formed at room temperature.

Coated poly(ethylene terephthalate) films were prepared according to the standard procedure using the naphthalocyanine compound solution.

Example E74

A solution of silicon 2,3-naphthalocyanine bis(trihexylsilyloxide), (0.0080 grams, CAS 92396-88-8) was prepared by adding the naphthalocyanine compound to dichloromethane (4.00 grams) and mixing at room temperature. N,N-dimethylformamide (12.01 grams) was added to this solution and mixed at room temperature. A small amount of insoluble residue was removed. To the resulting solution was added Mowital™ B30T polyvinyl butyral (3.9904 grams) and the resulting mixture was mixed until a solution was formed at room temperature.

Coated poly(ethylene terephthalate) films were prepared according to the standard procedure using the naphthalocyanine compound solution.

Example E75

A solution of silicon 2,3-naphthalocyanine dioctyloxide, (0.0081 grams, CAS 92941-50-9) was prepared by adding the naphthalocyanine compound to a mixture of N,N-dimethylformamide (12.01 grams), and methanol (4.01 grams) and mixing at room temperature until dissolved. A small amount of insoluble residue was removed. To the resulting solution was added Mowital™ B30T polyvinyl butyral (3.9940 grams), and the resulting mixture was mixed until a solution was formed at room temperature.

Coated poly(ethylene terephthalate) films were prepared according to the standard procedure using the naphthalocyanine compound solution.

Example E76

A mixture of silicon 2,3-naphthalocyanine dioctyloxide, (0.0080 grams, CAS 92941-50-9) was prepared by adding the naphthalocyanine compound to dichloromethane (4.13 grams) and mixing at room temperature. N,N-dimethylformamide (12.02 grams) was added to the mixture and mixed at room temperature. A small amount of insoluble residue was removed. To the resulting solution was added Mowital™ B30T polyvinyl butyral (3.9976 grams), and the resulting mixture was mixed until a solution was formed at room temperature.

Coated poly(ethylene terephthalate) films were prepared according to the standard procedure using the naphthalocyanine compound solution.

Example E77

A solution of a rylene compound was prepared by adding Lumogen® IR 788 (0.0022 grams, BASF Corporation), to a solution of N,N-dimethylformamide (12.0162 grams), and methanol (4.0230 grams) and mixing at room temperature until the Lumogen® IR 788 dissolved. To the resulting solution was added Mowital™ B30T polyvinyl butyral (3.9934 grams) and the resulting mixture was mixed until a solution was formed at room temperature.

Coated poly(ethylene terephthalate) films were prepared according to the standard procedure using the rylene compound solution.

Example E78

A solution of a rylene compound was prepared by adding Lumogen® IR 765 (0.0021 grams, BASF Corporation) to 16.0898 grams of the standard stabilizing solution and mixing at room temperature until the Lumogen® IR 788 dissolved. To the resulting solution was added Mowital™ B30T polyvinyl butyral (3.9991 grams) and the resulting mixture was mixed until a solution was formed at room temperature.

Coated poly(ethylene terephthalate) films were prepared according to the standard procedure using the rylene compound solution.

Example E79

A solution of a rylene compound was prepared by adding Lumogen® IR 765 (0.0011 grams), and Lumogen® IR 788 (0.0010 grams) to a solution of N,N-dimethylformamide (12.0042 grams), and methanol (4.0266 grams) and mixing at room temperature until the Lumogen® IR 765 and Lumogen® IR 788 dissolved. To the resulting solution was added Mowital™ B30T polyvinyl butyral (3.9942 grams) and the resulting mixture was mixed until a solution was formed at room temperature.

Coated poly(ethylene terephthalate) films were prepared according to the standard procedure using the rylene compound solution.

Example E80

A solution of a rylene compound was prepared by adding Lumogen® IR 765 (0.0021 grams, BASF Corporation) to 16.0886 grams of the standard stabilizing solution and mixing at room temperature until the Lumogen® IR 788 dissolved. To the resulting solution was added Mowital™ B30T polyvinyl butyral (3.9939 grams) and the resulting mixture was mixed until a solution was formed at room temperature.

Coated poly(ethylene terephthalate) films were prepared according to the standard procedure using the rylene compound solution.

Example E81

A solution of a rylene compound was prepared by adding Lumogen® IR 765 (0.0011 grams), and Lumogen® IR 788 (0.0012 grams) to a solution of N,N-dimethylformamide (12.0112 grams), and methanol (4.0131 grams) and mixing at room temperature until the Lumogen® IR 765 and Lumogen® IR 788 dissolved. To the resulting solution was added Mowital™ B30T polyvinyl butyral (3.9988 grams) and the resulting mixture was mixed until a solution was formed at room temperature.

Coated poly(ethylene terephthalate) films were prepared according to the standard procedure using the rylene compound solution.

Example E82

A solution of a rylene compound was prepared by adding Lumogen® IR 765 (0.0015 grams), and Lumogen® IR 788 (0.0013 grams) to a solution of N,N-dimethylformamide (12.0101 grams), and methanol (4.0013 grams) and mixing at room temperature until the Lumogen® IR 765 and Lumogen® IR 788 dissolved. To the resulting solution was added Mowital™ B30T polyvinyl butyral (3.9927 grams) and the resulting mixture was mixed until a solution was formed at room temperature.

Coated poly(ethylene terephthalate) films were prepared according to the standard procedure using the rylene compound solution.

TABLE 1

| | Film Data | | | |
| --- | --- | --- | --- | --- |
| Multiplier | Drawdown Thickness, mils | Multiplier | Tvis | Tsol |
| E1 | 10 | 1 | 0.741 | 0.550 |
| CE1 | 20 | 1 | 0.753 | 0.630 |
| E2 | 10 | 4 | 0.751 | 0.557 |
| E3 | 20 | 1 | 0.752 | 0.564 |
| E4 | 10 | 2 | 0.763 | 0.565 |
| CE2 | 20 | 1 | 0.770 | 0.584 |
| CE3 | 10 | 1 | 0.643 | 0.630 |
| CE3 | 20 | 1 | 0.643 | 0.619 |
| CE5 | 10 | 1 | 0.746 | 0.584 |
| CE6 | 10 | 1 | 0.475 | 0.574 |
| CE6 | 20 | 1 | 0.318 | 0.461 |
| E5 | 20 | 1 | 0.597 | 0.501 |
| E6 | 20 | 1 | 0.739 | 0.564 |
| E7 | 20 | 2 | 0.768 | 0.566 |
| E8 | 20 | 2 | 0.753 | 0.547 |
| E9 | 10 | 1 | 0.465 | 0.430 |
| E10 | 10 | 1 | 0.611 | 0.491 |
| E11 | 10 | 1 | 0.763 | 0.562 |
| E12 | 10 | 1 | 0.753 | 0.535 |
| E13 | 20 | 1 | 0.695 | 0.485 |
| E14 | 20 | 1 | 0.637 | 0.455 |
| E15 | 10 | 1 | 0.733 | 0.526 |
| E16 | 10 | 1 | 0.710 | 0.517 |
| E17 | 10 | 1 | 0.711 | 0.525 |
| E18 | 10 | 3 | 0.678 | 0.438 |
| E18(B) | 10 | 3 | 0.718 | 0.530 |
| E19 | 10 | 2 | 0.664 | 0.438 |
| E19(B) | 10 | 2 | 0.704 | 0.530 |
| E21 | 20 | 1 | 0.719 | 0.467 |
| E21(B) | 20 | 1 | 0.762 | 0.565 |
| E22 | 10 | 1 | 0.703 | 0.458 |
| E22(B) | 10 | 1 | 0.744 | 0.554 |
| E26 | 20 | 2 | 0.683 | 0.479 |
| E27 | 10 | 1 | 0.709 | 0.496 |
| E28 | 10 | 2 | 0.737 | 0.510 |
| E28(B) | 10 | 2 | 0.782 | 0.614 |
| E29 | 20 | 1 | 0.688 | 0.450 |

TABLE 1-continued

Film Data

| Multiplier | Drawdown Thickness, mils | Multiplier | Tvis | Tsol |
| --- | --- | --- | --- | --- |
| E29(B) | 20 | 1 | 0.729 | 0.544 |
| E30 | 20 | 1 | 0.744 | 0.454 |
| E30(B) | 20 | 1 | 0.789 | 0.549 |
| E31 | 10 | 1 | 0.837 | 0.727 |
| E31(B) | 10 | 1 | 0.888 | 0.880 |
| E31 | 20 | 1 | 0.794 | 0.644 |
| E31(B) | 20 | 1 | 0.860 | 0.780 |
| E32 | 20 | 1 | 0.753 | 0.477 |
| E32(B) | 20 | 1 | 0.798 | 0.577 |
| E33 | 10 | 1 | 0.846 | 0.737 |
| E33(B) | 10 | 1 | 0.897 | 0.892 |
| E33 | 20 | 1 | 0.774 | 0.612 |
| E33(B) | 20 | 1 | 0.821 | 0.741 |
| E35 | 10 | 2 | 0.708 | 0.451 |
| E35(B) | 10 | 2 | 0.751 | 0.546 |
| E36 | 10 | 1 | 0.732 | 0.486 |
| E36(B) | 10 | 1 | 0.776 | 0.588 |
| E37 | 10 | 4 | 0.739 | 0.494 |
| E37(B) | 10 | 4 | 0.784 | 0.598 |
| E38 | 10 | 1 | 0.811 | 0.685 |
| E38(B) | 10 | 1 | 0.860 | 0.829 |
| E38 | 20 | 1 | 0.727 | 0.590 |
| E38(B) | 20 | 1 | 0.771 | 0.714 |
| E40 | 20 | 2 | 0.754 | 0.484 |
| E40(B) | 20 | 2 | 0.799 | 0.586 |
| E41 | 10 | 2 | 0.765 | 0.519 |
| E41(B) | 10 | 2 | 0.811 | 0.628 |
| E42 | 10 | 1 | 0.874 | 0.788 |
| E42 | 20 | 1 | 0.860 | 0.771 |
| CE9 | 1.65 mm plaque | 1 | 0.600 | 0.560 |
| CE9 | 1.68 mm plaque | 1 | 0.682 | 0.542 |
| E45 | 1.65 mm plaque | 1 | 0.800 | 0.685 |
| E45 | 0.94 mm plaque | 1 | 0.865 | 0.779 |
| E45 | 0.84 mm plaque | 1 | 0.873 | 0.790 |
| E45 | 0.86 mm plaque | 1 | 0.871 | 0.793 |
| E54 | 0.89 mm plaque | 1 | 0.839 | 0.736 |
| E54 | 1.68 mm plaque | 1 | 0.764 | 0.616 |
| E54 | 1.55 mm plaque | 1 | 0.783 | 0.651 |
| E61 | 20 | 1 | 0.800 | 0.545 |
| E61(B) | 20 | 1 | 0.848 | 0.659 |
| E61 | 20 | 1 | 0.804 | 0.559 |
| E61(B) | 20 | 1 | 0.852 | 0.676 |
| E62 | 20 | 1 | 0.723 | 0.463 |
| E62(B) | 20 | 1 | 0.767 | 0.560 |
| E63 | 10 | 1 | 0.816 | 0.575 |
| E63(B) | 10 | 1 | 0.865 | 0.696 |
| E63 | 20 | 1 | 0.817 | 0.577 |
| E63(B) | 20 | 1 | 0.866 | 0.698 |
| E64 | 10 | 1 | 0.699 | 0.480 |
| E64(B) | 10 | 1 | 0.740 | 0.581 |
| E67 | 10 | 1 | 0.719 | 0.486 |
| E67(B) | 10 | 1 | 0.763 | 0.588 |
| E70 | 10 | 1 | 0.733 | 0.487 |
| E70(B) | 10 | 1 | 0.777 | 0.589 |
| E73 | 20 | 5 | 0.741 | 0.487 |
| E73(B) | 20 | 5 | 0.786 | 0.589 |
| E74 | 20 | 3 | 0.759 | 0.497 |
| E74(B) | 20 | 3 | 0.805 | 0.602 |
| E75 | 20 | 3 | 0.725 | 0.526 |
| E75(B) | 20 | 3 | 0.769 | 0.637 |
| E76 | 20 | 3 | 0.752 | 0.505 |
| E76(B) | 20 | 3 | 0.797 | 0.610 |
| E77 | 10 | 1 | 0.811 | 0.593 |
| E77(B) | 10 | 1 | 0.860 | 0.718 |
| E77 | 20 | 1 | 0.809 | 0.566 |
| E77(B) | 20 | 1 | 0.858 | 0.685 |
| E78 | 10 | 1 | 0.798 | 0.568 |
| E78(B) | 10 | 1 | 0.846 | 0.687 |
| E78 | 20 | 1 | 0.791 | 0.575 |
| E78(B) | 20 | 1 | 0.839 | 0.696 |
| E79 | 10 | 1 | 0.818 | 0.532 |
| E79(B) | 10 | 1 | 0.867 | 0.644 |
| E79 | 20 | 1 | 0.802 | 0.546 |
| E79(B) | 20 | 1 | 0.850 | 0.661 |
| E80 | 10 | 1 | 0.814 | 0.571 |
| E80(B) | 10 | 1 | 0.863 | 0.691 |
| E80 | 20 | 1 | 0.808 | 0.586 |
| E80(B) | 20 | 1 | 0.857 | 0.709 |
| E81 | 10 | 1 | 0.823 | 0.598 |
| E81(B) | 10 | 1 | 0.873 | 0.724 |
| E81 | 20 | 1 | 0.778 | 0.524 |
| E81(B) | 20 | 1 | 0.825 | 0.634 |
| E82 | 10 | 1 | 0.779 | 0.538 |
| E82(B) | 10 | 1 | 0.826 | 0.651 |
| E82 | 20 | 1 | 0.761 | 0.477 |
| E82(B) | 20 | 1 | 0.807 | 0.577 |

*Note: Sample numbers without any notation designate films whose solar control properties were calculated according to Simulation Method A. Sample numbers including the notation "(B)" refer to films whose solar control properties were calculated according to Simulation Method B.

TABLE 2

Laminate Data

| Laminate Sample No. | Film Sample No.* | Tvis | Tsol |
| --- | --- | --- | --- |
| CE4 | CE3b | 0.501 | 0.452 |
| E24 | E23a | 0.747 | 0.619 |
| E25 | E23a | 0.692 | 0.435 |
| E34 | E33b | 0.755 | 0.535 |
| CE7 |  | 0.750 | 0.864 |
| E39 | E38b | 0.696 | 0.506 |
| CE8 |  | 0.888 | 0.834 |
| E43 | E42b | 0.824 | 0.692 |
| E44 | E33a/E42a | 0.787 | 0.598 |
| CE10 | CE9(1.65 mm) | 0.596 | 0.496 |
| CE11 | CE9(1.68 mm) | 0.587 | 0.484 |
| E46 | E45 (1.65 mm) | 0.795 | 0.596 |
| E47 | E45 (1.63 mm) | 0.787 | 0.591 |
| E48 | E45 (0.94 mm) | 0.817 | 0.662 |
| E49 | E45 (0.89 mm) | 0.837 | 0.681 |
| E50 | E45 (0.84 mm) | 0.826 | 0.657 |
| E51 | E45 (0.84 mm) | 0.833 | 0.680 |
| E52 | E45 (0.86 mm) | 0.832 | 0.710 |
| E53 | E45 (0.86 mm) | 0.779 | 0.528 |
| E55 | E54 (0.89 mm) | 0.804 | 0.635 |
| E56 | E54 (0.89 mm) | 0.796 | 0.623 |
| E57 | E54 (1.68 mm) | 0.721 | 0.514 |
| E58 | E54 (1.68 mm) | 0.735 | 0.534 |
| E59 | E54 (1.55 mm) | 0.749 | 0.556 |
| E60 | E54 (1.63 mm) | 0.755 | 0.573 |
| E65 | E64a | 0.760 | 0.595 |
| E66 | E64b | 0.643 | 0.447 |
| E68 | E67a | 0.794 | 0.629 |
| E69 | E67b | 0.694 | 0.547 |
| E71 | E70a | 0.806 | 0.653 |
| E72 | E70a | 0.742 | 0.517 |

*Note: "a" refers to a drawdown thickness of 10 mils; "b" refers to a drawdown thickness of 20 mils; plaque thickness given in parentheses where relevant.

While certain of the preferred embodiments of the present invention have been described and specifically exemplified above, it is not intended that the invention be limited to such embodiments. Various modifications may be made without departing from the scope and spirit of the present invention, as set forth in the following claims.

What is claimed is:

1. A solar control laminate comprising a solar control layer and at least one additional layer, said solar control layer comprising a solar control composition, and said solar control composition comprising at least one infrared absorbing naphthalocyanine or rylene compound and an ethylene acid copolymer or an ionomer of an ethylene acid copolymer; wherein the at least one infrared absorbing naphthalocyanine or rylene compound is soluble in the solar control composition.

2. The solar control laminate of claim 1, wherein the concentration of the at least one naphthalocyanine or rylene compound is from about 0.01 to about 5 wt %, based on the total weight of the solar control composition.

3. The solar control laminate of claim 1, wherein the solar control composition further comprises one or more additives selected from the group consisting of plasticizers, dispersants, surfactants, chelating agents, coupling agents, UV absorbers, hindered amine light stabilizers (HALS), processing aides, flow enhancing additives, lubricants, pigments, dyes, flame retardants, impact modifiers, nucleating agents to increase crystallinity, antiblocking agents such as silica, thermal stabilizers, UV stabilizers, adhesives, primers, crosslinking agents, hardening agents, pH adjusting agents, antifoaming agents inorganic infrared absorbents, organic infrared absorbents and wetting agents.

4. A solar control laminate comprising a solar control layer and at least one additional layer, said solar control layer comprising a solar control composition, and said solar control composition comprising an ethylene acid copolymer or an ionomer of an ethylene acid copolymer and a concentration of an infrared absorbing naphthalocyanine or rylene compound; wherein said infrared absorbing naphthalocyanine or rylene compound is soluble in said solar control layer; wherein said solar control laminate has a layer thickness, a level of transmission of solar light and a level of transmission of visible light such that when the laminate is simulated using Simulation Method A, the simulated level of transmittance of visible light, $T_{vis\text{-}sim}$, and the simulated level of transmittance of solar light, $T_{sol\text{-}sim}$, are such that for a naphthalocyanine compound $0.65 < T_{vis\text{-}sim} < 0.75$ and $T_{sol\text{-}sim} < (0.472(T_{vis\text{-}sim}) - 0.150)$ and for a rylene compound $0.65 < T_{vis\text{-}sim} < 0.75$ and $T_{sol\text{-}sim} < (1.719(T_{vis\text{-}sim}) - 0.801)$.

5. The solar control laminate of claim 4, wherein $T_{sol\text{-}sim}$ for a rylene compound $< (1.952(T_{vis\text{-}sim}) - 1.008)$.

6. The solar control laminate of claim 4, wherein $T_{sol\text{-}sim}$ for a rylene compound $< (2.083(T_{vis\text{-}sim}) - 1.125)$.

7. The solar control laminate of claim 4, wherein the naphthalocyanine compound is an alkoxy-substituted naphthalocyanine compound.

8. The solar control laminate of claim 4, wherein the naphthalocyanine compound is a butoxy-substituted naphthalocyanine compound.

9. The solar control laminate of claim 4, wherein the rylene compound is a quaterrylene compound or a substituted quaterrylene compound.

10. The solar control laminate of claim 4, having a structure selected from the group consisting of polymeric sheet/solar control layer, rigid sheet/solar control layer, rigid sheet/polymeric sheet/solar control layer, first rigid sheet/polymeric sheet/solar control layer/additional polymeric sheet/second rigid sheet, rigid sheet/polymeric sheet/first solar control layer/additional polymeric sheet/additional film, rigid sheet/additional polymeric sheet/additional film/polymeric sheet/solar control layer, and first rigid sheet/polymeric sheet/solar control layer/additional polymeric sheet/second rigid sheet/second additional polymeric sheet/additional film/third additional polymeric sheet/third rigid sheet, wherein "/" indicates adjacent layers, wherein the solar control layer may be a film or a sheet, wherein the "second" layer of any film or sheet may be the same as or different from the first layer of that film or sheet, and wherein the "third" layer may be the same as or different from the first and second layers of that film or sheet; and further wherein said rigid sheet is selected from the group consisting of glass sheets; polymeric sheets comprising one or more of polycarbonates, acrylics, polyacrylates, cyclic polyolefins, and metallocene-catalyzed polystyrenes; metal plates; and ceramic plates.

11. A method of reducing the transmission of infrared radiation to the interior of a structure having an exterior window, said method comprising the steps of
   a. constructing a solar control laminate according to claim 4; and
   b. inserting the solar control laminate into the exterior window of the structure.

12. The method of claim 11, wherein the structure is a building or a vehicle.

13. The method of claim 11, wherein the naphthalocyanine compound is an alkoxy-substituted naphthalocyanine compound or a butoxy-substituted naphthalocyanine compound.

14. The method of claim 11, wherein the rylene compound is a quaterrylene compound or a substituted quaterrylene compound.

* * * * *